US012683431B2

(12) United States Patent
Sohi et al.

(10) Patent No.: US 12,683,431 B2
(45) Date of Patent: Jul. 14, 2026

(54) MOBILE COMPUTING DEVICE ENCLOSURE WITH EMBEDDED WIRELESS CHARGING MODULE

(71) Applicant: Google LLC, Mountain View, CA (US)

(72) Inventors: Mojan Sohi, Redwood City, CA (US); Veera Venkata Siva Nagesh Polu, Sunnyvale, CA (US); Igor Markovsky, Campbell, CA (US)

(73) Assignee: Google LLC, Mountain View, CA (US)

( * ) Notice: Subject to any disclaimer, the term of this patent is extended or adjusted under 35 U.S.C. 154(b) by 917 days.

(21) Appl. No.: 17/998,471

(22) PCT Filed: Dec. 30, 2020

(86) PCT No.: PCT/US2020/067462
§ 371 (c)(1),
(2) Date: Nov. 10, 2022

(87) PCT Pub. No.: WO2021/236167
PCT Pub. Date: Nov. 25, 2021

(65) Prior Publication Data
US 2023/0208191 A1        Jun. 29, 2023

Related U.S. Application Data

(60) Provisional application No. 63/027,633, filed on May 20, 2020.

(51) Int. Cl.
H02J 50/00          (2016.01)
H02J 50/70          (2016.01)
H02J 50/80          (2016.01)

(52) U.S. Cl.
CPC ............ H02J 50/005 (2020.01); H02J 50/70 (2016.02); H02J 50/80 (2016.02)

(58) Field of Classification Search
USPC ........................................................ 320/108
See application file for complete search history.

(56) References Cited

U.S. PATENT DOCUMENTS 9,266,266 B2      2/2016   Hong et al.
10,027,160 B2     7/2018   Miele et al.
(Continued)

FOREIGN PATENT DOCUMENTS

KR      20140101665 A      8/2014
KR      20180044562 A      5/2018

OTHER PUBLICATIONS

International Preliminary Report on Patentability from International Application No. PCT/US2020/067462 dated Dec. 1, 2022, 9 pp.
(Continued)

*Primary Examiner* — Mohammed Alam
(74) *Attorney, Agent, or Firm* — Shumaker & Sieffert, P.A.

(57) ABSTRACT

An example mobile computing device includes at least one processor, a battery, and a device enclosure. The device enclosure at least partially encloses the mobile computing device. At least one portion of the device enclosure comprises at least one first element, a region that is at least partially formed in and at least partially surrounded by the at least one first element, at least one insulative element formed in the region, wherein the at least one insulative element includes at least one electrically insulative material, and a wireless charging module included in the region. The wireless charging module is configured to wirelessly communicate with an external charging device to induce a current in the wireless charging unit, and wherein the current is used to charge the battery of the mobile computing device.

20 Claims, 16 Drawing Sheets

(56)                    References Cited

U.S. PATENT DOCUMENTS

| | | | |
|---|---|---|---|
| 10,050,478 B2 | 8/2018 | Kim et al. | |
| 10,084,349 B2 | 9/2018 | Larsson et al. | |
| 2014/0065948 A1* | 3/2014 | Huang .................. | H02J 7/0045 |
| | | | 361/679.01 |
| 2014/0145674 A1 | 5/2014 | Jang et al. | |
| 2015/0077047 A1 | 3/2015 | Chen | |
| 2015/0255994 A1* | 9/2015 | Kesler ................... | B60L 53/124 |
| | | | 307/10.1 |
| 2015/0303735 A1* | 10/2015 | Kari ........................ | H02J 50/12 |
| | | | 320/108 |
| 2015/0311740 A1 | 10/2015 | Hilario et al. | |
| 2017/0040107 A1 | 2/2017 | Peralta et al. | |
| 2017/0063132 A1* | 3/2017 | Sultenfuss .............. | H02J 50/70 |
| 2018/0191882 A1* | 7/2018 | Kim ..................... | H04B 1/3827 |
| 2019/0097462 A1 | 3/2019 | Larsson et al. | |
| 2019/0223310 A1 | 7/2019 | Wright et al. | |

OTHER PUBLICATIONS

Response to Communication Pursuant to Rules 161(1) and 162 EPC dated Nov. 23, 2022, from counterpart European Application No. 20848823.9, filed May 23, 2023, 12 pp.

International Search Report and Written Opinion of International Application No. PCT/US2020/067462 dated Apr. 7, 2021, 15 pp.

International Search Report and Written Opinion of International Application No. PCT/US2020/067462 dated Mar. 9, 2021, 15 pp.

Communication pursuant to Article 94(3) EPC from counterpart European Application No. 20848823.9 dated Jan. 20, 2026, 7 pp.

\* cited by examiner

100

118    116

114

112

300

313

311

317

313

315

312

Y

Z

X

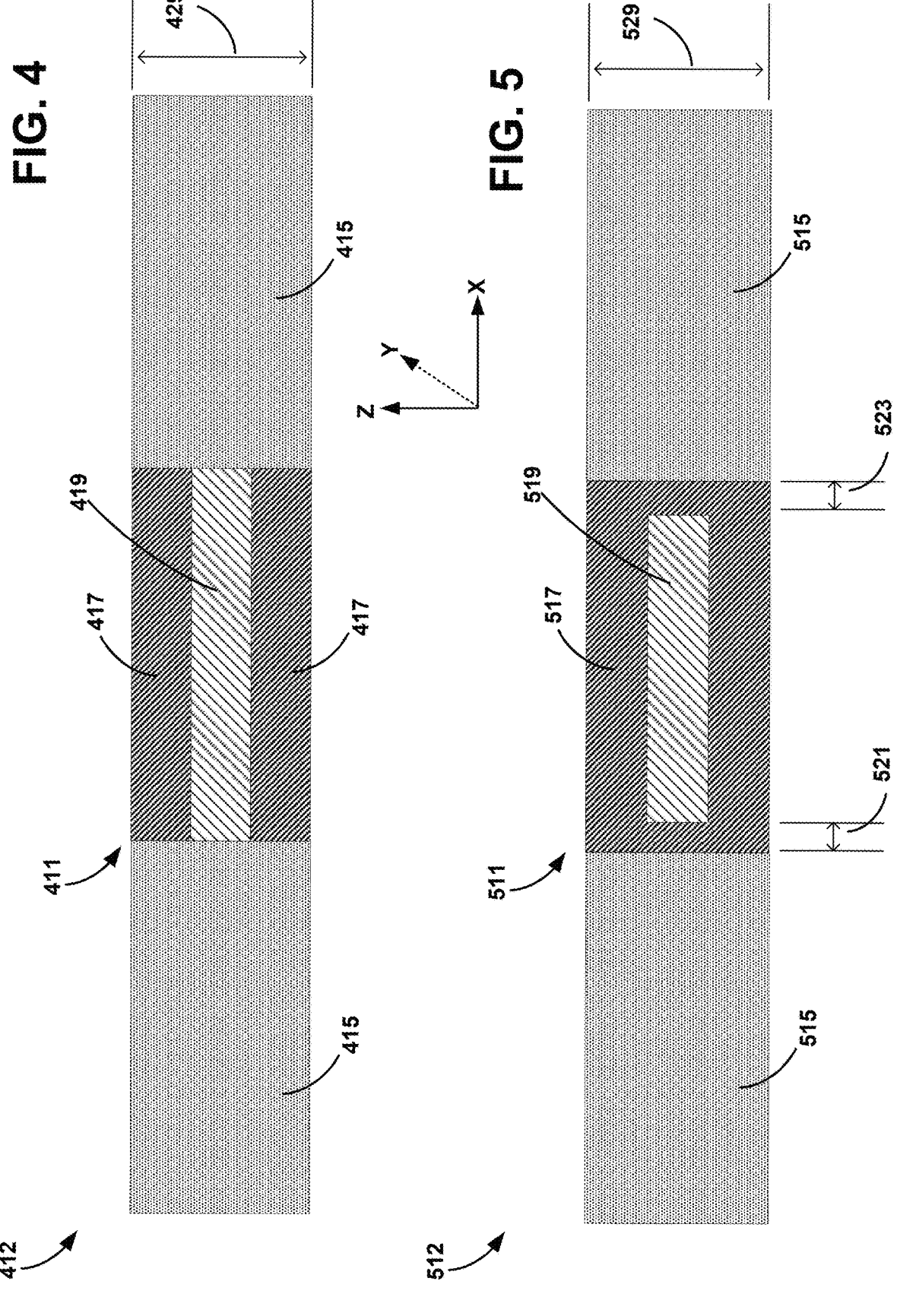

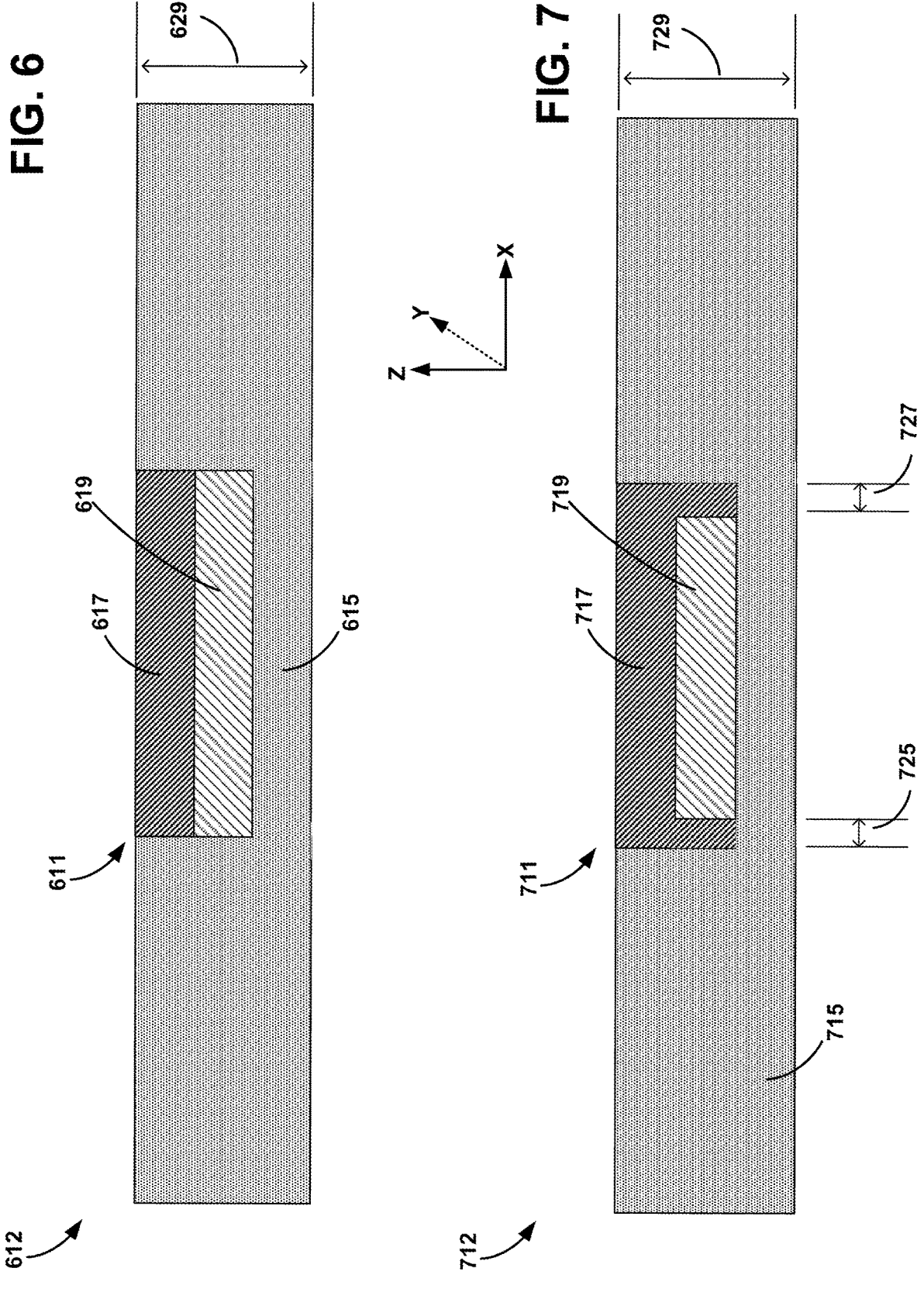

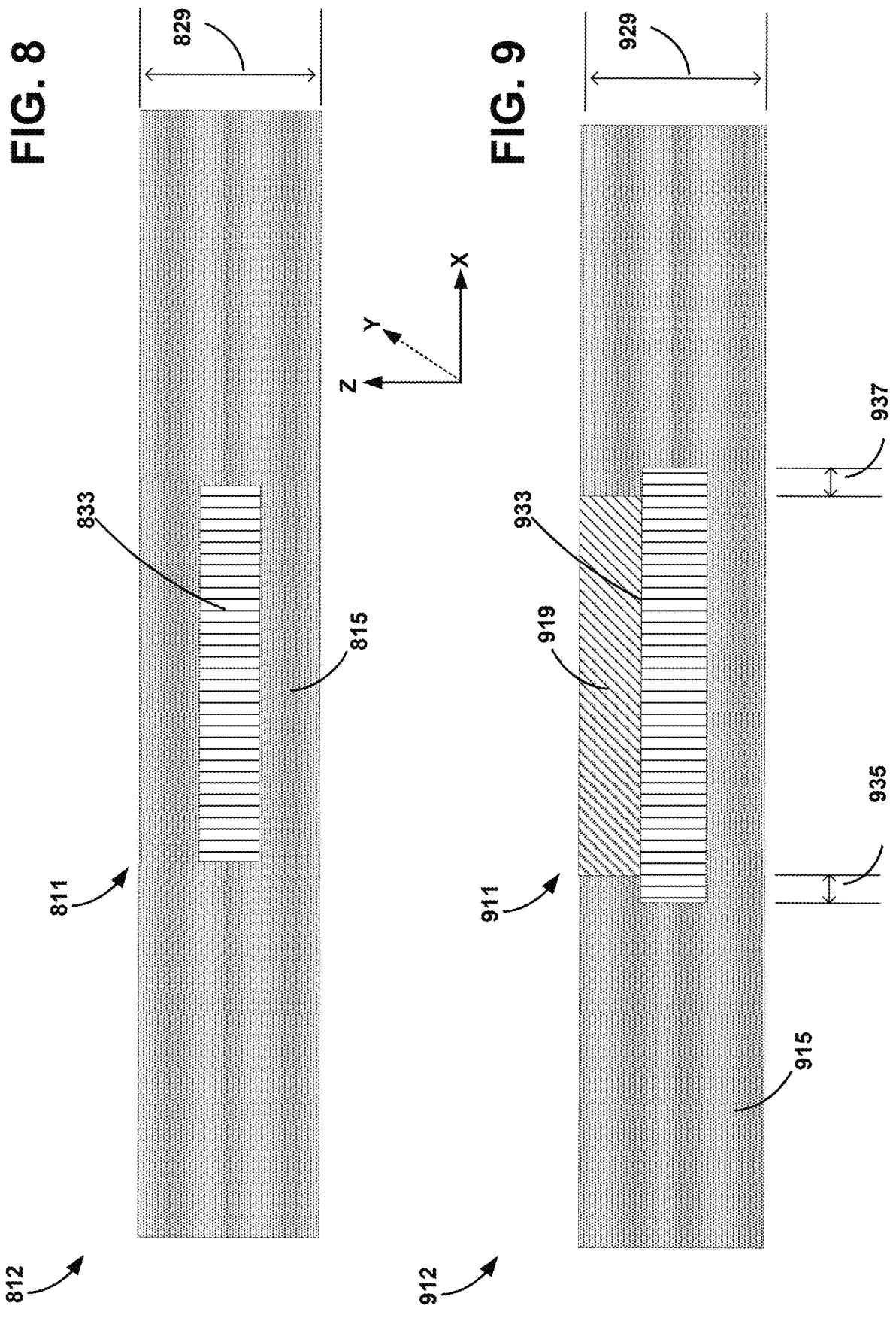

Distance may be adjusted based on functional requirements

Glass Fiber

Carbon Fiber

Wireless Charging Module

Distance may be adjusted based
on functional requirements

Glass Fiber

Carbon Fiber

Wireless Charging Module

Distances (x,y,z) may be adjusted based on functional requirements

Molded composite to metal joint (e.g. using nano-molding technology or NMT)

Glass Fiber

Wireless Charging Module

Metal

Distances (x,y,z) may be adjusted
based on functional requirements

Wireless Charging Module

Glass Fiber and/or Carbon Fiber and/or Metal

Thermal Spreader

Distances (x,y,z) may be adjusted based on functional requirements

Shielding material or Glass Fiber

Glass Fiber

Glass Fiber and/or Carbon Fiber and/or Metal

Copper Coil

Shielding Material

Distance may be adjusted based
on functional requirements

Glass Fiber

Wireless Charging Module

Glass Fiber and/or Carbon Fiber and/or Metal

Distance may be adjusted based on functional requirements

Resin

Wireless Charging Module

Glass Fiber and/or Carbon Fiber and/or Metal

MOBILE COMPUTING DEVICE ENCLOSURE WITH EMBEDDED WIRELESS CHARGING MODULE

This application claims the benefit of U.S. Provisional Application Ser. No. 63/027,633, filed May 20, 2020, the entire contents of which are hereby incorporated by reference.

TECHNICAL FIELD

This disclosure relates to an enclosure for a mobile computing device.

BACKGROUND

Mobile computing devices, such as smartphones and smartwatches, are used extensively for both business and personal uses. Due to the widespread and repeated use of these devices over time, users typically need to re-charge the batteries of these devices at regular intervals. In many cases, users may re-charge a device battery by connecting a physical charging cable to both the device and a charging source (e.g., outlet or power converter). Some mobile computing devices may include a wireless charging module to enable wireless charging of the batteries of these devices via wireless communication with an external charging source.

SUMMARY

In general, this disclosure describes techniques to provide a more efficient overall device design whereby the mobile computing device enclosure itself includes an embedded wireless charging module. By embedding components such as the wireless charging module into the device enclosure, the device may include additional space inside the enclosure for a larger-sized battery and/or additional modules. In some cases, the dimensions of the device inside the enclosure may be reduced by embedding components such as the wireless charging module into the device enclosure.

In one example, a mobile computing device includes one or more processors, a battery, and a device enclosure. The device enclosure at least partially encloses the mobile computing device. At least one portion of the device enclosure comprises at least one first element, a region that is at least partially formed in and at least partially surrounded by the at least one first element, at least one insulative element formed in the region, wherein the at least one insulative element includes at least one electrically insulative material, and a wireless charging module included in the region. The wireless charging module is configured to wirelessly communicate with an external charging device to induce a current in the wireless charging unit, and wherein the current is used to charge the battery of the mobile computing device.

In another example, a device enclosure includes a plurality of portions that at least partially enclose a mobile computing device. At least one portion of the plurality of portions comprises at least one first element, a region that is at least partially formed in and at least partially surrounded by the at least one first element, at least one insulative element formed in the region, wherein the at least one insulative element includes at least one electrically insulative material, and a wireless charging module included in the region. The wireless charging module is configured to wirelessly communicate with an external charging device to induce a current in the wireless charging unit, and wherein the current is used to charge the battery of the mobile computing device.

The details of one or more aspects of this disclosure are set forth in the accompanying drawings and the description below. Other features, objects, and advantages of the disclosure will be apparent from the description and drawings, and from the claims.

BRIEF DESCRIPTION OF DRAWINGS

FIGS. 4-22 are cross-sectional diagrams illustrating various examples of at least one portion of a device enclosure, such as the at least one portion of the device enclosure shown in FIG. 3, in accordance with one or more aspects of the present disclosure.

DETAILED DESCRIPTION

Figure 1A:
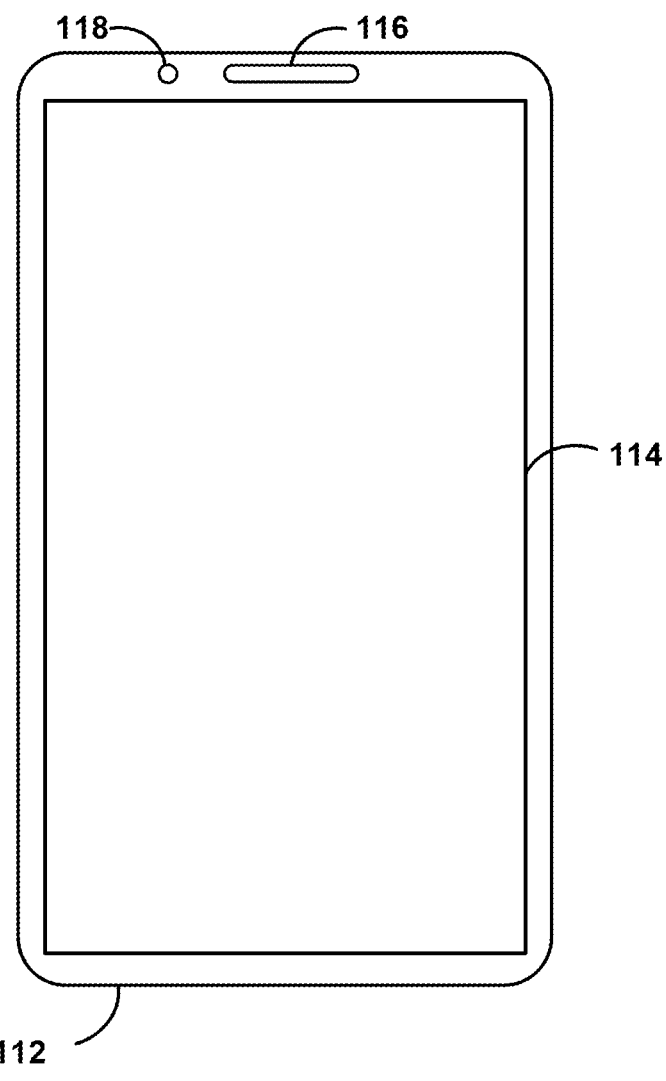
FIG. 1A is a conceptual diagram illustrating a front side of an example mobile computing device that includes a device enclosure, in accordance with one or more aspects of the present disclosure.

As noted above, mobile computing devices (e.g., smartphones, smartwatches, wireless headphones, other wearable devices) typically have batteries that need to be recharged at regular intervals based on widespread and repeated use. Various mobile computing devices may include a wireless charging module, such as a module comprising a copper coil or antenna, to enable wireless charging of the batteries of these devices via wireless communication with an external charging source. Typically, such a wireless charging module is located inside the device enclosure and is integrated with the circuitry of the mobile computing device within the enclosure.

Mobile computing devices often suffer from limited heat dissipation during use over time, which can result in charging and performance throttling. With increasing competition in the industry and customer demands, current mobile computing devices often include an increasing number of modules and added features within the same amount of space inside the device enclosure, which is often small and very limited in size. As noted above, existing mobile computing devices that provide wireless charging functionality typically include a wireless charging module inside the device enclosure, taking up valuable space. Thus, many existing devices suffer from space limitations inside the enclosure. These limitations may result in limitations on battery size and capacity, and often little-to-no room for thermal solutions, which may ultimately result in limited device performance.

The techniques of the present disclosure provide a more efficient design whereby the hardware device enclosure itself may include an embedded wireless charging module. Mobile computing devices typically include a housing or enclosure that provides strength, durability, and/or aesthetic properties for these devices. By embedding modules such as the wireless charging module into the device enclosure, the device can provide additional space inside the enclosure for a larger-sized battery and/or additional modules. Alternatively, if the size of the battery is maintained, the dimensions of the device inside the enclosure may be reduced by embedding components such as the wireless charging module into the device enclosure. In some cases, the enclosure itself may also function as a thermal spreader, as described in further detail below. In certain cases, the enclosure may include particles or sheets of a shielding material to provide shielding functionality for the wireless charging module. In addition, in some cases, the embedding of the wireless charging module within the enclosure may increase or otherwise improve the overall design efficiency of the mobile computing device, and may also potentially reduce the manufacturing complexity of certain components that are located inside the device enclosure.

According to certain techniques disclosed herein, the device housing may include at least one portion that includes at least one first element and at least one insulative element, as well as a wireless charging module. The one or more insulative elements and the wireless charging module may be positioned within a region, as will be described in further detail below.

FIG. 1A is a conceptual diagram illustrating a front side of an example mobile computing device 100 that includes a device enclosure 112 according to one or more aspects of the present disclosure. In the particular example of FIG. 1A, mobile computing device 100 is a smartphone. However, in other cases, examples of mobile computing device 100 may include, but are not limited to, a tablet computer, a personal digital assistant (PDA), a laptop computer, a portable gaming device, a portable media player, an e-book reader, a wearable computing device (e.g., a watch, a wrist-mounted computing device, a head-mounted computing device, one or more wireless headphones), or other type of mobile computing device. As will be described in further detail below, mobile computing device 100 may be or include one or more processors that are configured to execute one or more applications.

Figure 1B:
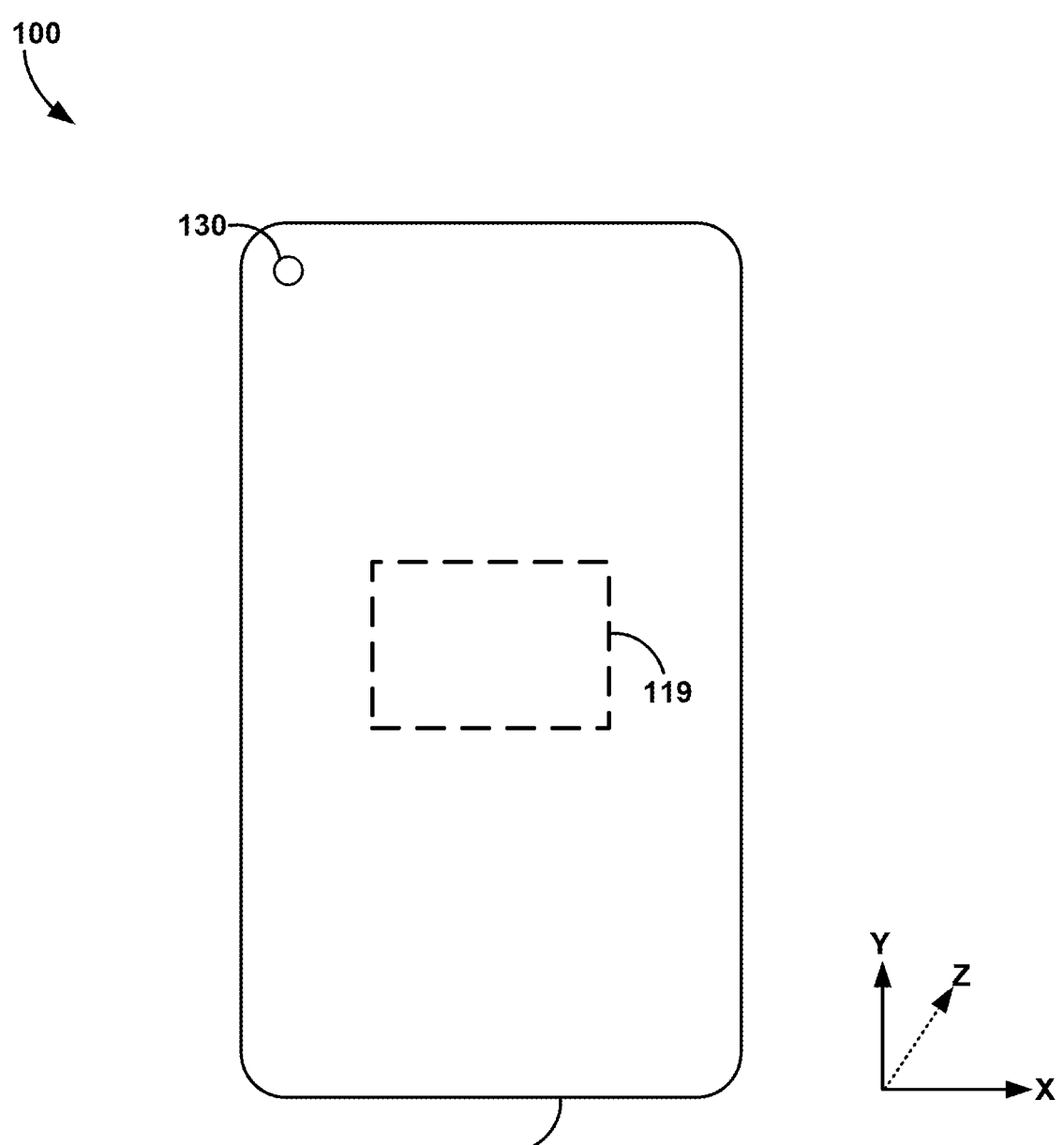
FIG. 1B illustrates a conceptual view of an example back side of the mobile computing device shown in FIG. 1A, in accordance with one or more aspects of the present disclosure.

As shown in FIG. 1A, the front side of mobile computing device 100 includes a display device 114, a speaker 116, and a front camera 118. In some cases, display device 114 may comprise a presence-sensitive display device, such as a touchscreen. Although FIG. 1A illustrates only one speaker 116 and one camera 118, mobile computing device 100 may include any number of speakers and/or cameras on its front side. Camera 118 may be any type of camera (e.g., an infrared camera, a thermographic camera, a thermal imaging camera, a light-sensitive camera, a red-green-blue (RGB) camera, an ultrasonic camera). Although not shown in FIG. 1A, mobile computing device 100 may include one or more other various components (e.g., one or more additional speakers, a power button, volume buttons, and the like) along one or more edges of device 100. As will be described herein, a wireless charging module may be embedded or included in at least one portion of device enclosure 112, such as, for example, a portion on the front or back side of mobile computing device 100. FIG. 1B shows one such non-limiting example.

FIG. 1B illustrates a conceptual view of the back side of mobile computing device 100, which includes camera 130. Although FIG. 1B illustrates only one camera 130, mobile computing device 100 may include any number of cameras on its back side. Camera 130 may be the same or a different type of camera as camera 118 on the front side of mobile computing device 100.

Due to its widespread and repeated use over time, the battery of mobile computing device 100 may need to be re-charged at regular intervals. Mobile computing device 100 includes a wireless charging module 119, which may in some cases include a copper coil, to enable wireless charging of the battery of mobile computing device 100 via wireless communication with an external charging source. In some examples, the coil of wireless charging module 119 may be compliant with one or more wireless charging standards, such as the Qi specification promulgated by the Wireless Power Consortium. In other examples, wireless charging module 119 may include an antenna that is compliant with one or more wireless charging standards, such as the wireless charging (WLC) specification promulgated by the NFC (Near Field Communication) Forum.

According to various aspects of the present disclosure, and as described in more detail below, at least one portion of device enclosure 112 (e.g., a portion on the back side of mobile computing device 100, such as shown in FIG. 1B) may include or otherwise embed wireless charging unit 119 of mobile computing device 100. In various examples, device enclosure 112 may be made of one or more materials, such as one or more of a combination of conductive, insulative, or other materials. By embedding modules such as wireless charging module 119 into at least one portion of device enclosure 112, mobile computing device 100 can provide additional space inside device enclosure 112 for a larger-sized battery and/or additional modules. Alternatively, if the size of the battery is maintained, the dimensions of mobile computing device 100 inside device enclosure 112 may be reduced by embedding modules such as wireless charging module 119 into device enclosure 112. The embedding of wireless charging module 119 within at least one portion of device enclosure 112 may increase or otherwise improve the overall design efficiency, and may also potentially reduce the manufacturing complexity of certain components of mobile computing device 100 that are located inside device enclosure 112.

For example, as described in more detail below, device enclosure 112 may have multiple portions that at least partially enclose mobile computing device 100. At least one of these portions (e.g., a back portion of device enclosure 112, such as the portion illustrated on the back side of mobile computing device 100 shown in FIG. 1B) may include at least one first element, a region that is at least partially formed in and at least partially surrounded by the at least one first element, at least one insulative element formed in the region, and wireless charging module 119 included in the region. The at least one insulative element includes at least one electrically insulative material. In some examples, the at least one first element may comprise at least one conductive element having at least one electrically conductive material. The at least one first element may include at least one conductive element (e.g., metal, carbon fiber) and/or at least one insulative element (e.g., glass fiber, plastic). For instance, the at least one first element may include at least one sheet layer of one or more of metal, glass fiber, plastic, carbon fiber, or any combination thereof. As noted above, wireless charging module 119 may be included in the region, which is configured to wirelessly communicate with an external charging device (e.g., external charging station, external mat that is plugged into a power outlet) to induce a current in wireless charging unit 119, where the current is used to charge the battery of mobile computing device 100.

In one specific, non-limiting example, wireless charging module 119 of mobile computing device 100 may comprise a flat piece that is embedded into phone enclosure 112. For instance, wireless charging module 119 may be a component that may be sandwiched in device enclosure 112 or positioned within a groove or recessed region on the inside of device enclosure 112 in the shape of wireless charging module 119. When wireless charging module 119 is positioned within such a recessed region, wireless charging module 119 may be at least partially exposed on an inner portion of device enclosure 112 to one or more components located inside of device enclosure 112. However, in other examples in which wireless charging module 119 is sandwiches in device enclosure 112 between different layers (e.g., between different layers of at least one first element and/or at least one insulative element), wireless charging module 119 is not exposed on the inner portion of device enclosure 112, but the one or more contact elements (e.g., electrical contacts) coupled to wireless charging module 119 are exposed to the inner portion of device enclosure 112 and to one or more components located inside of device enclosure 112.

In various non-limiting design examples, the overall depth or thickness of device enclosure 112 (e.g., enclosure wall thickness) may have a value of up to approximately 1 mm. For instance, device enclosure 112 may have an enclosure wall thickness of approximately 0.7 mm. In the example of FIG. 1B, this thickness would be measured along the z-axis that is perpendicular to the plane illustrated in FIG. 1B. (In FIG. 1B, the x-axis is the horizontal axis within the plane of FIG. 1B, and the y-axis is the vertical axis within the plane of FIG. 1B). The x-axis and y-axis dimensions of various components included in device enclosure 112 may vary, in various different examples, depending on design considerations. The z-axis depth distance to which these components are embedded into device enclosure 112 can be as high or as great as the enclosure thickness itself given that the components can be exposed and masked with paint or other cosmetic finishes, for example. The values or value ranges recited herein are provided for non-limiting purposes of illustration only.

In various cases, the z-axis thickness (e.g., a thickness perpendicular to the plane illustrated in FIG. 1B) of wireless charging module 119 is now freed within the inside of device enclosure 112. If this additional thickness (e.g., 400 microns of depth in non-limiting examples) is allocated to an increase in size of the battery of mobile computing device 100, extra battery life and performance may be gained. For example, in non-limiting examples, the added space within device enclosure 112 may permit an approximate 10% increase in size of the battery, which may result in an approximate 10% extra battery life. In alternate examples, the embedding of wireless charging module 119 within device enclosure 112 may permit a reduction in size of mobile computing device 100 that is located inside of device enclosure 112, where the size of the battery is maintained.

Figure 2:
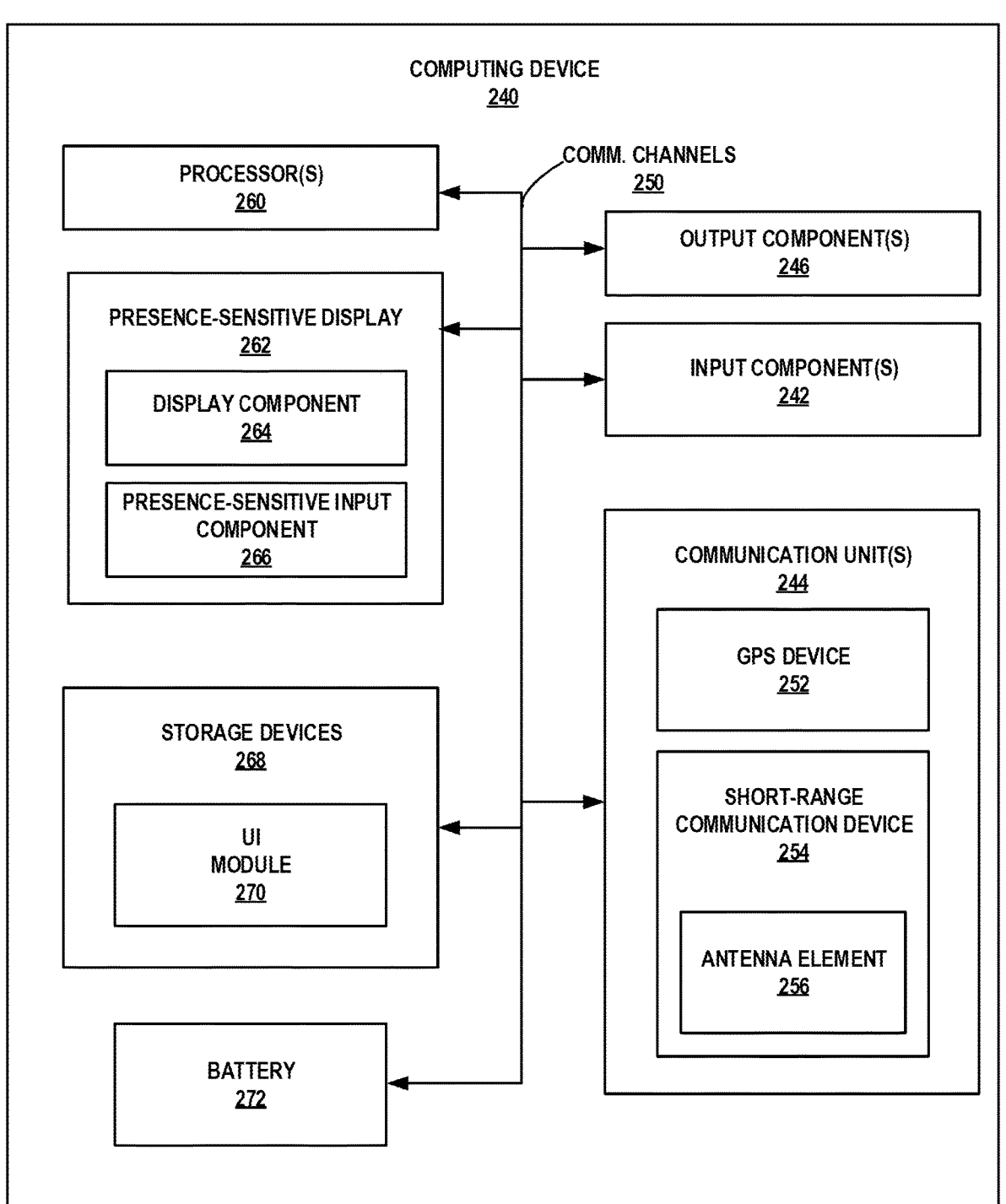
FIG. 2 is a block diagram illustrating components of an example mobile computing device, such as the mobile computing device shown in FIGS. 1A-1B, in accordance with one or more aspects of the present disclosure.

FIG. 2 is a block diagram illustrating components of a mobile computing device 200, which is one example of a mobile computing device 200 shown in FIGS. 1A-1B, in accordance with one or more aspects of the present disclosure. FIG. 2 illustrates only one particular example of mobile computing device 200, and many other examples of mobile computing device 200 may be used in other instances and may include a subset of the components included in example mobile computing device 200 or may include additional components not shown in FIG. 2.

As shown in the example of FIG. 2, mobile computing device 200 includes presence-sensitive display 262, one or more processors 260, one or more input components 242, one or more communication units 244, one or more output components 246, and one or more storage devices 268. Presence-sensitive display 262 includes display component 264 and presence-sensitive input component 266.

Communication channels 250 may interconnect each of the components 260, 262, 268, 272, 242, 244, and 246 for inter-component communications (physically, communicatively, and/or operatively). In some examples, communication channels 250 may include a system bus, a network connection, an inter-process communication data structure, or any other method for communicating data.

One or more input components 242 of mobile computing device 200 may receive input. Examples of input are tactile, audio, image and video input. Input components 242 of mobile computing device 200, in one example, includes a presence-sensitive display, touch-sensitive screen, mouse, keyboard, voice responsive system, a microphone or any other type of device for detecting input from a human or machine. Presence-sensitive input component 266 of presence-sensitive display 262 may, in some cases, be one of input components 242. In some examples, input components 242 include one or more sensor components such as one or more location sensors (global positioning system (GPS) components, local wireless components, cellular components), one or more temperature sensors, one or more movement sensors (e.g., accelerometers, gyros), one or more pressure sensors (e.g., barometer), one or more ambient light sensors, and one or more other sensors (e.g., microphone, a still camera, a video camera, a body camera, eyewear, or other camera device that is operatively coupled to computing device 200, infrared proximity sensor, hygrometer, and the like).

One or more output components 246 of mobile computing device 200 may generate output. Examples of output are tactile, audio, still image and video output. Output components 246 of mobile computing device 200, in one example, includes a presence-sensitive display, sound card, video graphics adapter card, speaker, cathode ray tube (CRT) monitor, liquid crystal display (LCD), or any other type of device for generating output to a human or machine. Display component 264 of presence-sensitive display 262 may, in some cases, be one of output components 246.

One or more communication units 244 of mobile computing device 200 may communicate with external devices via one or more wired and/or wireless networks by transmitting and/or receiving network signals on the one or more networks. For example, communication units 244 may be configured to communicate over a network with a remote computing system. As shown, one or more communication units 244 may include GPS device 252 and short-range communication device 254. Communication unit 244 may include a network interface card (e.g. such as an Ethernet card), an optical transceiver, a radio frequency transceiver, or any other type of device that can send and/or receive information. Other examples of communication units 244 may include short wave radios, cellular data radios, wireless network radios, as well as universal serial bus (USB) controllers.

GPS device 252 may include one or more satellite radios capable of determining the geographical location of mobile computing device 200. Alternatively, mobile computing device 200 may transmit the GPS coordinates to a remote server.

Short-range communication device 254 may be a near-field communication (NFC) device. As shown, short-range communication device 254 may include antenna element 256. In general, short-range communication device 254 may be configured to communicate wirelessly with other devices in physical proximity to short-range communication device 254 (e.g., approximately 0-100 meters). In other examples, short-range communication device 254 may be replaced with an alternative short-range communication device. These alternative short-range communication devices may operate according to Bluetooth®, Ultra-Wideband radio, or other similar protocols. In some examples, short-range communication device 254 may include a rectifier configured to electronically rectify a voltage received at antenna element 256. In some examples, the rectified voltage may be used by short-range communication device 254 to supply electrical power to mobile computing device 200.

Antenna element 256 may be any suitable conductive element configured to receive signals via a short-range communication. For example, antenna element 256 may form an electrically conductive element that is concentrically wound. Said differently, antenna element 256 may be a conductive length of wire that is wound to potentially maximize an inductance of the length of wire, thereby improving a signal strength and/or an amount of power transferred via a short-range communication. In some examples, antenna element 256 may be configured to process NFC signals. For example, antenna element 256 may be configured to operate in an industrial, scientific, and medical (ISM) radio band. In some examples, antenna element 256 may be configured to operate within less than 20 centimeters from another antenna element. In some examples, one or more functions ascribed to antenna element 256 may be performed by a wireless charging module and/or one or more components operatively coupled to the wireless charging module.

Presence-sensitive display 262 of mobile computing device 200 includes display component 264 and presence-sensitive input component 266. Display component 264 may be a screen at which information is displayed by presence-sensitive display 262 and presence-sensitive input component 266 may detect an object at and/or near display component 264. As one example range, presence-sensitive input component 266 may detect an object, such as a finger or stylus that is within two inches or less of display component 264. Presence-sensitive input component 266 may determine a location (e.g., an [x, y] coordinate) of display component 264 at which the object was detected. In another example range, presence-sensitive input component 266 may detect an object six inches or less from display component 264 and other ranges are also possible. Presence-sensitive input component 266 may determine the location of display component 264 selected by a user's finger using capacitive, inductive, and/or optical recognition techniques. In some examples, presence-sensitive input component 266 also provides output to a user using tactile, audio, or video stimuli as described with respect to display component 264. In the example of FIG. 2, presence-sensitive display 262 may present a user interface.

While illustrated as an internal component of mobile computing device 200, presence-sensitive display 262 may also represent and an external component that shares a data path with mobile computing device 200 for transmitting and/or receiving input and output. For instance, in one example, presence-sensitive display 262 represents a built-in component of mobile computing device 200 located within and physically connected to the external packaging of mobile computing device 200 (e.g., a screen on a mobile phone). In another example, presence-sensitive display 262 represents an external component of mobile computing device 200 located outside and physically separated from the packaging or housing of mobile computing device 200 (e.g., a monitor, a projector, etc. that shares a wired and/or wireless data path with mobile computing device 200).

Presence-sensitive display 262 of mobile computing device 200 may receive tactile input from a user of mobile computing device 200. Presence-sensitive display 262 may receive indications of the tactile input by detecting one or more tap or non-tap gestures from a user of mobile computing device 200 (e.g., the user touching or pointing to one or more locations of presence-sensitive display 262 with a finger or a stylus pen). Presence-sensitive display 262 may present output to a user. Presence-sensitive display 262 may present the output as a graphical user interface, which may be associated with functionality provided by various functionality of mobile computing device 200. For example, presence-sensitive display 262 may present various user interfaces of components of a computing platform, operating system, applications, or services executing at or accessible by mobile computing device 200 (e.g., an electronic message application, a navigation application, an Internet browser application, a mobile operating system, etc.). A user may interact with a respective user interface to cause mobile computing device 200 to perform operations relating to one or more of the various functions.

Presence-sensitive display 262 of mobile computing device 200 may detect two-dimensional and/or three-dimensional gestures as input from a user of mobile computing device 200. For instance, a sensor of presence-sensitive display 262 may detect a user's movement (e.g., moving a hand, an arm, a pen, a stylus, etc.) within a threshold distance of the sensor of presence-sensitive display 262. Presence-sensitive display 262 may determine a two- or three-dimensional vector representation of the movement and correlate the vector representation to a gesture input (e.g., a hand-wave, a pinch, a clap, a pen stroke) that has multiple dimensions. In other words, presence-sensitive display 262 can detect a multi-dimension gesture without requiring the user to gesture at or near a screen or surface at which presence-sensitive display 262 outputs information for display. Instead, presence-sensitive display 262 can detect a multi-dimensional gesture performed at or near a sensor which may or may not be located near the screen or surface at which presence-sensitive display 262 outputs information for display.

Mobile computing device 200 also includes one or more batteries, including battery 272. Battery 272 may be configured to store energy for use by one or more components of mobile computing device 200 during operation, such as one or more of the components shown in FIG. 2. Examples of battery 272 may include lead-acid, nickel metal hydride, lithium ion, lithium polymer, or another type of rechargeable battery. A wireless charging unit, such as wireless charging unit 119 shown in FIG. 1B, may be configured to provide electrical power to charge battery 272 of mobile computing device 200, as described herein.

One or more processors 260 may implement functionality and/or execute instructions associated with mobile computing device 200. Examples of processors 260 include application processors, display controllers, auxiliary processors, one or more sensor hubs, and any other hardware configured to function as a processor, a processing unit, or a processing device. One or more applications 230 may be operable by processors 260 to perform various actions, operations, or functions of mobile computing device 200. For example, processors 260 of mobile computing device 200 may retrieve and execute instructions stored by storage devices 268 that cause processors 260 to perform the operations of applications 230. The instructions, when executed by processors 260, may cause mobile computing device 200 to store information within storage devices 268.

One or more storage devices 268 within mobile computing device 200 may store information for processing during operation of mobile computing device 200 (e.g., mobile computing device 200 may store data accessed by applications 230 during execution at mobile computing device 200). In some examples, storage devices 268 include a temporary memory, meaning that a primary purpose of storage devices 268 is not long-term storage. Storage devices 268 on mobile computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 268, in some examples, also include one or more computer-readable storage media. Storage devices 268, in some examples, include one or more non-transitory computer-readable storage mediums. Storage devices 268 may be configured to store larger amounts of information than typically stored by volatile memory. Storage devices 268 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 268 may store program instructions and/or information (e.g., data) associated with applications 230. Storage devices 268 may include a memory configured to store data or other information associated with applications 230.

UI module 270 manages user interactions with presence-sensitive display 262 and other components of mobile computing device 200. In other words, UI module 270 may act as an intermediary between various components of mobile computing device 200 to make determinations based on user input detected by presence-sensitive display 262 and generate output at presence-sensitive display 262 in response to the user input.

Figure 3:
FIG. 3 is a conceptual diagram illustrating a portion of an example device enclosure included on a back side of a mobile computing device, such as the mobile computing device shown in FIGS. 1A-1B and/or FIG. 2, in accordance with one or more aspects of the present disclosure.
Figures 10, 11:
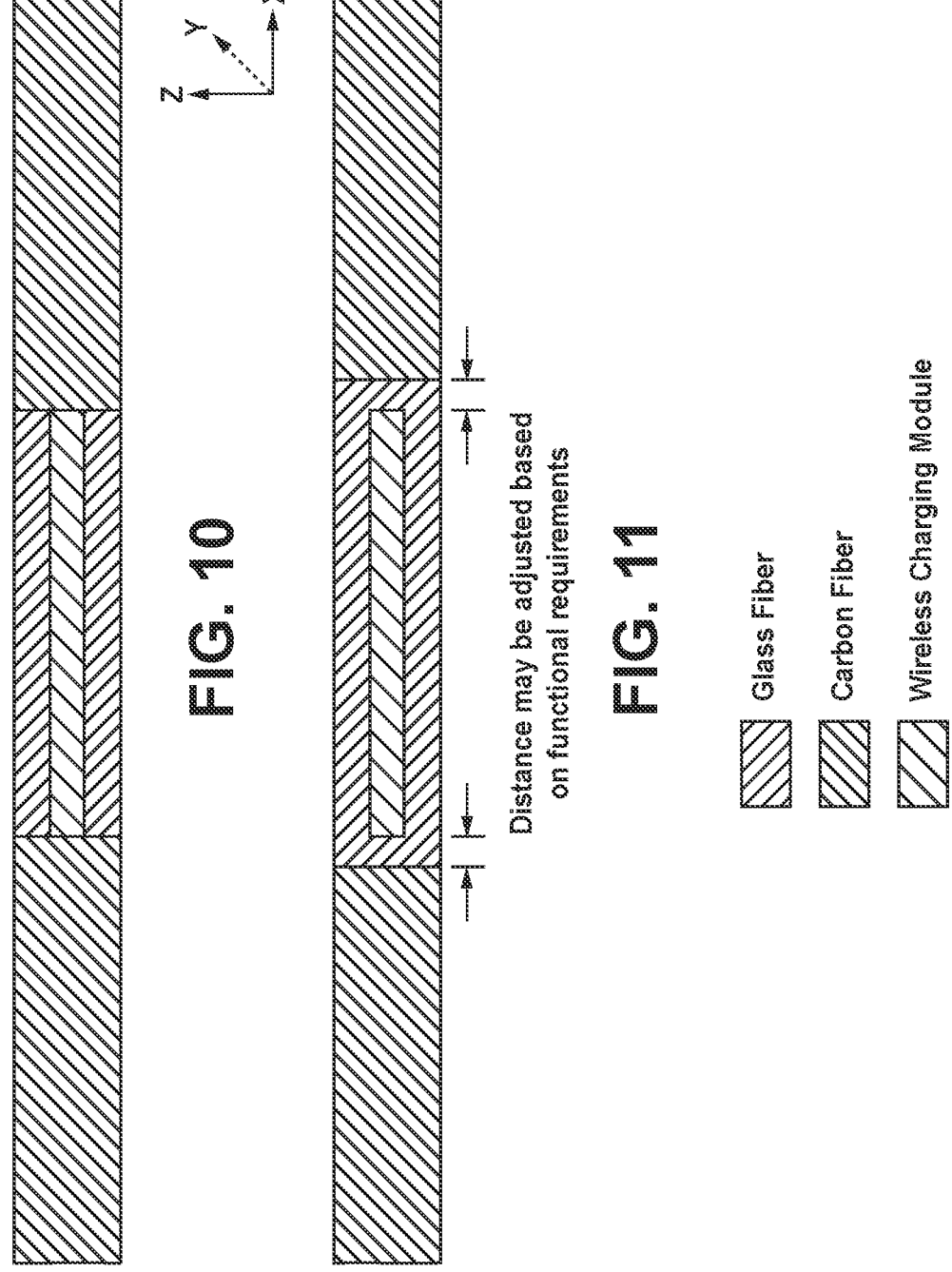

FIG. 3 is a conceptual diagram illustrating a portion of a device enclosure 312 included on a back side of a mobile computing device 300. Mobile computing device 300 may be one example of mobile computing device 100 shown in FIGS. 1A and 1B and/or mobile computing device 200 shown in FIG. 2, and the back portion of device enclosure 312 may be one example of the back portion of device enclosure 112 shown in FIG. 1B.

The portion of device enclosure 312 shown in FIG. 3 may include at least one first element 315, as well as a region 311. In some examples, the at least one first element 315 may include at least one conductive element having at least one electrically conductive material (e.g., metal, carbon fiber). In some examples, the at least one first element 315 may include at least one insulative element having at least one electrically insulative material (e.g., glass fiber, plastic). In certain examples, the at least one first element 315 may include one or more of at least one conductive element, at least one insulative element, or any combination thereof. In the example of FIG. 3, region 311 may have a rectangular-shaped area in cross section. However, in other examples, region 311 may have other polygon-shaped areas in cross section, such as a circular-shaped cross-sectional area. Region 311 may be at least partially formed in and at least partially surrounded by the at least one first element 315. At least one insulative element 317 and a wireless charging module (not shown in FIG. 3) may also be included in region 311, where the wireless charging module is configured to wirelessly communicate with an external charging device in order to charge mobile computing device 300. In the example of FIG. 3, the at least one insulative element 317 may be formed at or near the top of region 311, which is positioned at or near the external surface of device enclosure 312. However, in other examples, one or more other elements may be formed at or near the top of region 311 (e.g., such as shown in FIGS. 8-9 and FIGS. 16-17).

In some examples, the portion of device enclosure 312 shown in FIG. 3 may be made of a composite resin, such as an injected molded thermoplastic resin, in which the first element 315, region 311, insulative element, and wireless charging module are embedded or otherwise included. In some examples, the portion of device enclosure 312 may be made of a metal material (e.g., aluminum) that is nano-molded to a composite resin (e.g., thermoplastic resin), in which the first element 315, region 311, insulative element, and wireless charging module are embedded or otherwise included.

In various non-limiting design examples, the overall depth or thickness of device enclosure 312 (e.g., enclosure wall thickness) may have a value of up to approximately 1 mm. For instance, device enclosure 312 may have an enclosure wall thickness of approximately 0.7 mm. In the example of FIG. 3, this thickness would be measured along the z-axis that is perpendicular to the plane illustrated in FIG. 3. (In FIG. 3, the x-axis is the horizontal axis within the plane of FIG. 3, and the y-axis is the vertical axis within the plane of FIG. 3). The x-axis and y-axis dimensions of various components included in device enclosure 312 may vary, in various different examples, depending on design considerations. The z-axis depth distance to which these components are embedded into device enclosure 312 can be as high or as great as the enclosure thickness itself given that the components can be exposed and masked with paint or other cosmetic finishes, for example. The values or value ranges recited herein are provided for non-limiting purposes of illustration only.

FIGS. 4-22 are cross-sectional diagrams illustrating various examples of the portion of device enclosure 312, taken across line 313-313 shown in FIG. 3. The components illustrated in FIGS. 4-22 are not necessarily drawn to scale. In various non-limiting design examples for each of FIGS. 4-22, the overall depth or thickness of the device enclosure (e.g., enclosure wall thickness 429, 529, 629, 729, 829, 929 for device enclosure 412, 512, 612, 712, 812, 912, respectively, or similar wall thicknesses for the device enclosures of FIGS. 10-20) may have a value of up to approximately 1 mm. For instance, the device enclosure may have an enclosure wall thickness of approximately 0.7 mm. In the examples of FIGS. 4-22, this thickness would be measured along a z-axis, which is the vertical axis within the plane of FIGS. 4-22. (In FIGS. 4-22, the x-axis is the horizontal axis within the plane of FIGS. 4-22, and the y-axis is the axis that is perpendicular to the plane of FIG. 3). In non-limiting examples, for any of FIGS. 4-22 that illustrate a thermal spreading element and/or graphite element, such an element may have a z-axis thickness of up to 0.4 mm, and in some cases, such an element may have a z-axis thickness that is quite a bit less than 0.4 mm (e.g., a thickness less than or equal to 0.1 mm). In any of FIGS. 4-22 that illustrate a shielding element (e.g., sheet layer), such a shielding element may have a z-axis thickness of up to 0.4 mm (e.g., a thickness approximately or just less than 0.2 mm). In any of FIGS. 4-22 that illustrate a wireless charging module, this module may have a z-axis thickness of up to 0.4 mm, and in some cases may have a z-axis thickness of approximately 0.2 mm. In examples in which the wireless charging module includes a coil, the coil thickness may have a similar dimension (e.g., up to 0.4 mm, such as approximately 0.2 mm). The dimensions or dimension ranges recited herein are provided for non-limiting purposes of illustration only.

The x-axis and y-axis dimensions in FIGS. 4-22 of various components included in the device enclosure of FIGS. 4-22 (e.g., shielding element, thermal spreading element, wireless charging module and/or coil) may vary, in various different examples, depending on design considerations. The z-axis depth distance to which these components are embedded into the device enclosure can be as high or as great as the enclosure thickness itself given that the components can be exposed and masked with paint or other cosmetic finishes, for example.

FIG. 4 illustrates an example portion of device enclosure 412, which is one example of device enclosure 312 of FIG. 3. As shown in the cross-sectional view of FIG. 4, the illustrated portion of device enclosure 412 includes at least one first element 415 and region 411. In some examples, the at least one first element 415 may include at least one conductive element having at least one electrically conductive material (e.g., metal, carbon fiber). In some examples, the at least one first element 415 may include at least one insulative element having at least one electrically insulative material (e.g., glass fiber, plastic). In certain examples, the at least one first element 415 may include one or more of at least one conductive element, at least one insulative element, or any combination thereof. Region 411 is one example of region 311 shown in FIG. 3. Region 411 is at least partially formed in and at least partially surrounded by the at least one first element 415. In various cases, the at least one first element 415 may comprise one or more sheet layers of a conductive material (e.g., metal, carbon fiber) and/or one or more sheet layers of an insulative material (e.g., glass fiber, plastic).

Figure 21:
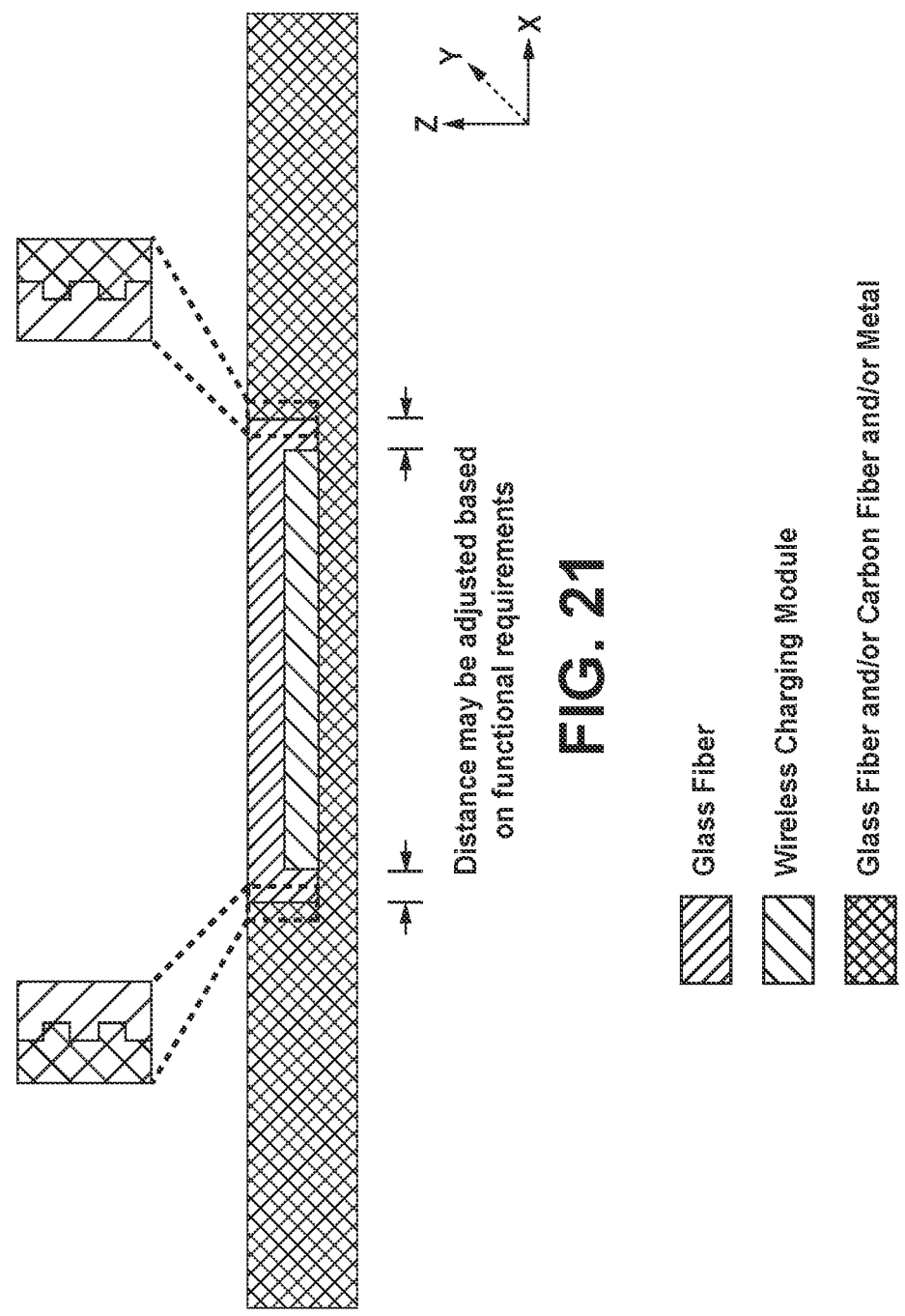

At least one insulative element 417 and a wireless charging module 419 are included in region 411. For instance, one or more sheet layers of insulative material (e.g., glass fiber) may be positioned beneath wireless charging module 419 within region 411, as shown in FIG. 4, and one or more sheet layers of the insulative material may be positioned above wireless charging module 419 within region 411. In certain cases, at least one boundary between one or more sheet layers of one type of material (e.g., material of first element 415) may overlap and/or interlock (e.g., similar to knuckle joints) with one or more sheet layers of another type of material (e.g., insulative element 417), such as shown in the example of FIG. 21. (FIG. 10 further illustrates one example of FIG. 4 in which first element 415 is carbon fiber and insulative material 417 is glass fiber, and in which wireless charging unit 419 is positioned between an upper portion of glass fiber and a lower portion of glass fiber.)

FIG. 5 is a cross-sectional diagram illustrating an alternate example of a portion of device enclosure 512, which also includes at least one first element 515, region 511, at least one insulative element 517, and wireless charging module 519. The example of FIG. 5 is similar to the example of FIG. 4, except that there are defined width distances 521 and 523 between wireless charging module 519 and first element 515 on each side of region 511, as illustrated in FIG. 5. In the view of FIG. 5, distance 521 separates a portion of wireless charging module 519 from a portion of first element 515 on the left side by one portion of insulative element 517, and distance 523 separates another portion of wireless charging module 519 from another portion of first element 515 on the right side by another portion of insulative element 517. During the manufacturing process, distances 521 and 523 may be adjusted based on certain functional parameters. For example, in order to reduce potential interference for higher-performance or higher-efficiency parameters, distances 521 and 523 may be increased and have higher values, such that wireless charging module 519 is separated from first element 515 by a larger amount of insulative element 517. However, for lower-performance or lower-power parameters, distances 521 and 523 may be decreased and have lower values. (FIG. 11 further illustrates one example of FIG. 5 in which first element 515 is carbon fiber and insulative material 517 is glass fiber.)

Another adjustable distance in the manufacturing process is the depth distance of wireless charging module 519 within region 511, such as the distance of wireless charging module 519 (e.g., top of wireless charging module 519 illustrated in FIG. 5) from the top of region 511 shown in FIG. 5. In some cases, wireless charging unit 519 may be positioned closer to the top of region 511, while in other cases, it may be positioned farther away from the top of region 511 (e.g., deeper within region 511). The positioning of wireless charging module 519 within region 511 may be adjusted during manufacture based on one or more functional parameters and design optimizations/efficiencies.

Figure 22:
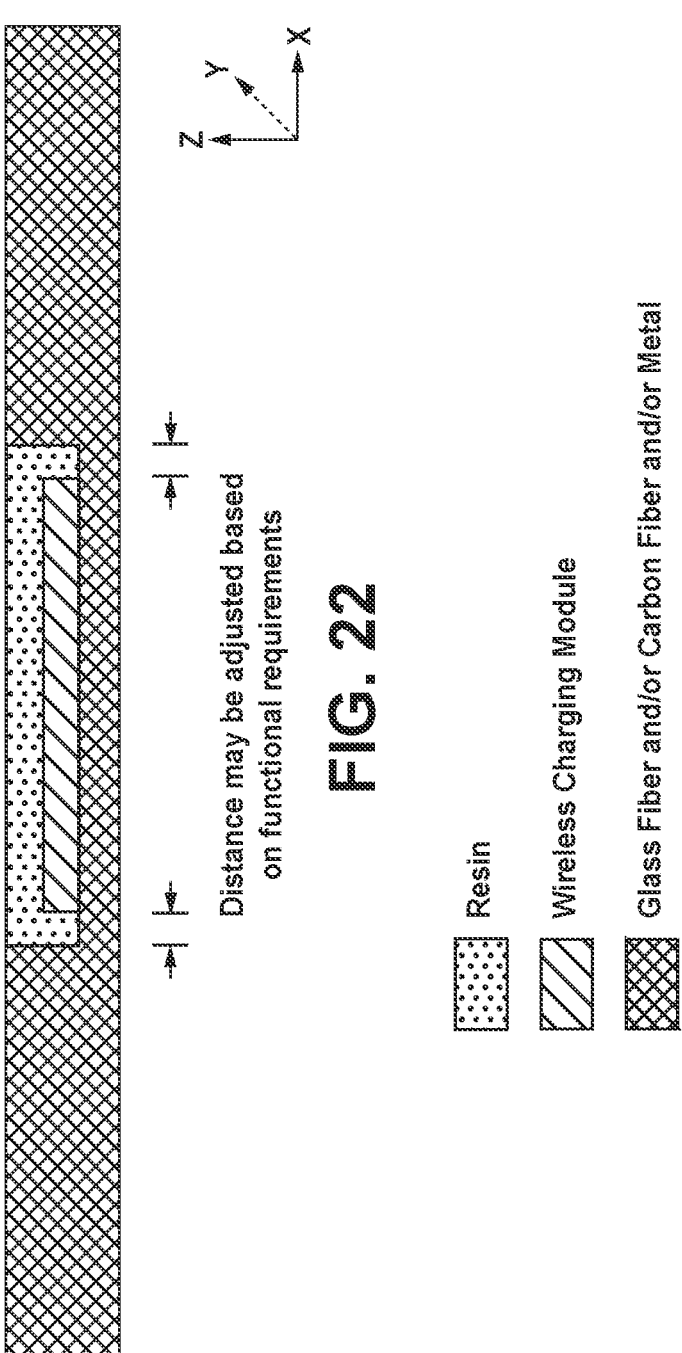

Referring to FIG. 5, portions of device enclosure 512 may be made of various different materials. First element 515 may include at least one electrically conductive material (e.g., metal such as aluminum, carbon fiber) and/or at least one electrically insulative material (e.g., plastic, glass fiber). In some examples, first element 515 may include at least one sheet layer of one or more of metal, glass fiber, carbon fiber, plastic, or any combination thereof. Insulative element 517 includes at least one electrically insulative material. In some examples, insulative element 517 may include one or more layers of glass fiber. In some examples, such as shown in FIG. 22, insulative element 517 may include a composite resin, such as an injected molded thermoplastic resin.

Figures 14, 15:
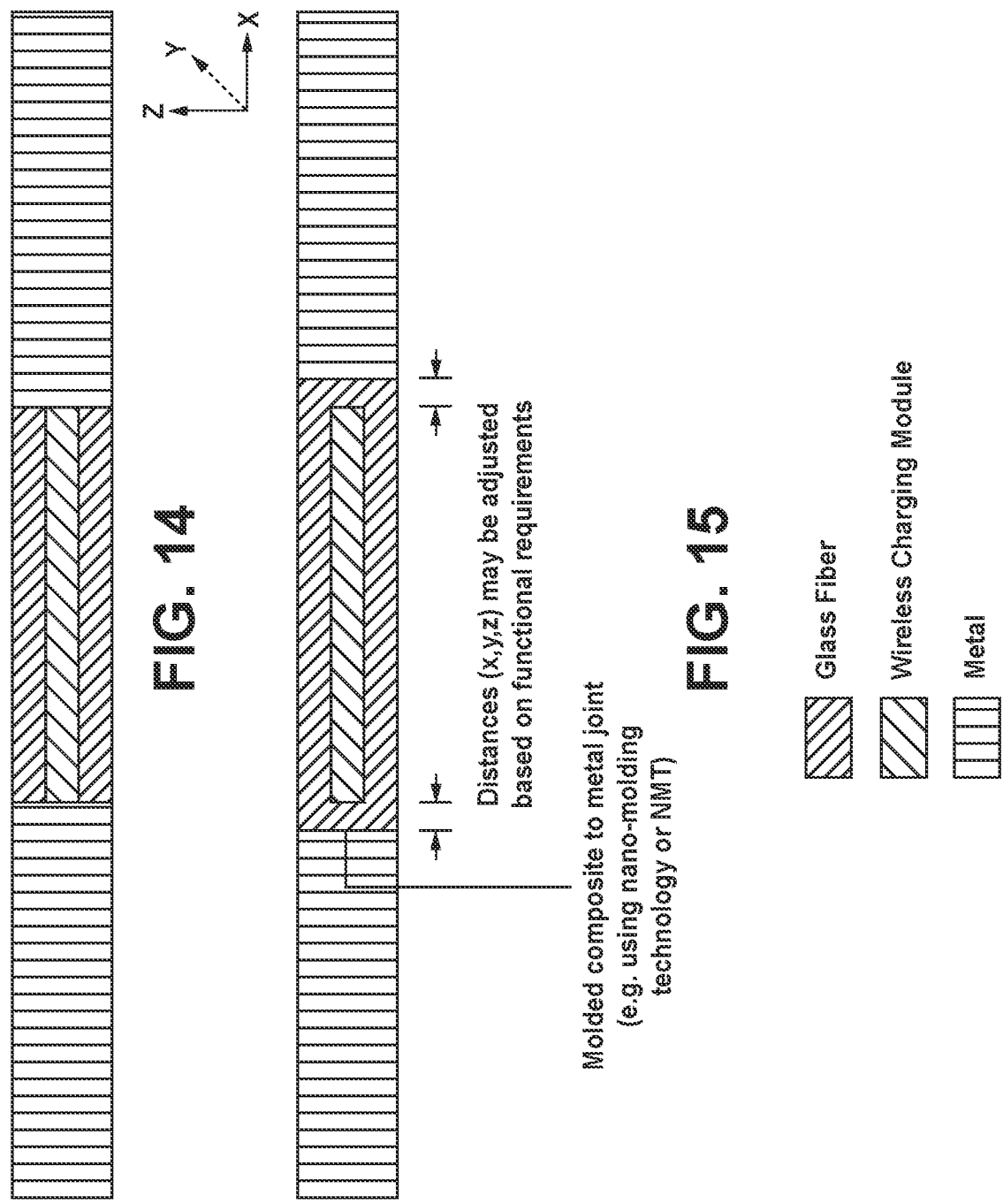

In certain cases, first element 515 may include metal (e.g., aluminum), or a composite material that includes metal and/or one or more other materials (e.g., carbon fiber and/or glass fiber), such as shown in FIGS. 14-22. In some cases, first element 515 may include plastic. In certain cases, such as those in which first element 515 includes at least metal (such as shown, e.g., in FIGS. 14-15), nano-molding technology may be used to nano mold certain components containing metal to other materials (e.g., composite materials) that are injection molded. For example, nano-molding technology may be used to nano mold first element 515 to other elements (e.g., insulative element 517) in device enclosure. FIGS. 14-15 illustrate examples of the use of nano molding.

In some examples, the portion of device enclosure shown in FIG. 5 also includes at least one contact element or interconnects (not shown) that is coupled to wireless charging module 519. These one or contact elements are configured to electrically couple wireless charging module 519 to the battery of the mobile computing device. For example, these contact elements (e.g., contact pads) may be connected to one or more portions of wireless charging module 519 (e.g., positioned on the left or right sides of wireless charging module 519). During operation of the mobile computing device, these contact elements may be coupled to one or more electrical contacts (e.g., spring elements or other mechanically biased elements) located inside device enclosure 512, which may be connected either directly or indirectly (e.g., via a charging integrated circuit located either inside or outside of the device enclosure) to the battery of the mobile computing device. Through such coupling of the contact elements of wireless charging module 519 to the electrical contacts, wireless charging unit 519 is capable of electrically charging the battery while it communicates wirelessly with an external charging device. For example, when wireless charging unit 519 communicates wirelessly with an external charging device, a current may be induced in the coil of wireless charging unit 519, and this current may provide electrical power to charge the battery of the mobile computing device.

In some examples, at least a portion of the at least one contact element is exposed on an inner portion of device enclosure 519 (e.g., the bottom portion of device enclosure 519 shown in FIG. 5, facing down) to one or more components located inside of device enclosure 519. In the example shown in FIG. 5, as well as other examples shown in various other figures, wireless charging unit 519 is sandwiched between one or more other layers, such that at least a portion of a conductive element or an insulative element (e.g., insulative element) separates wireless charging module 519 from the inner portion of device enclosure 512, such that only the at least one contact element is exposed on the inner portion of device enclosure 519.

However, in certain other examples (not illustrated in FIG. 5), a region similar to region 511 comprises a recessed region. In these examples, at least a portion of the wireless charging module is also exposed on the inner portion of the device enclosure to one or more components located inside of the device enclosure.

Figures 18, 19:
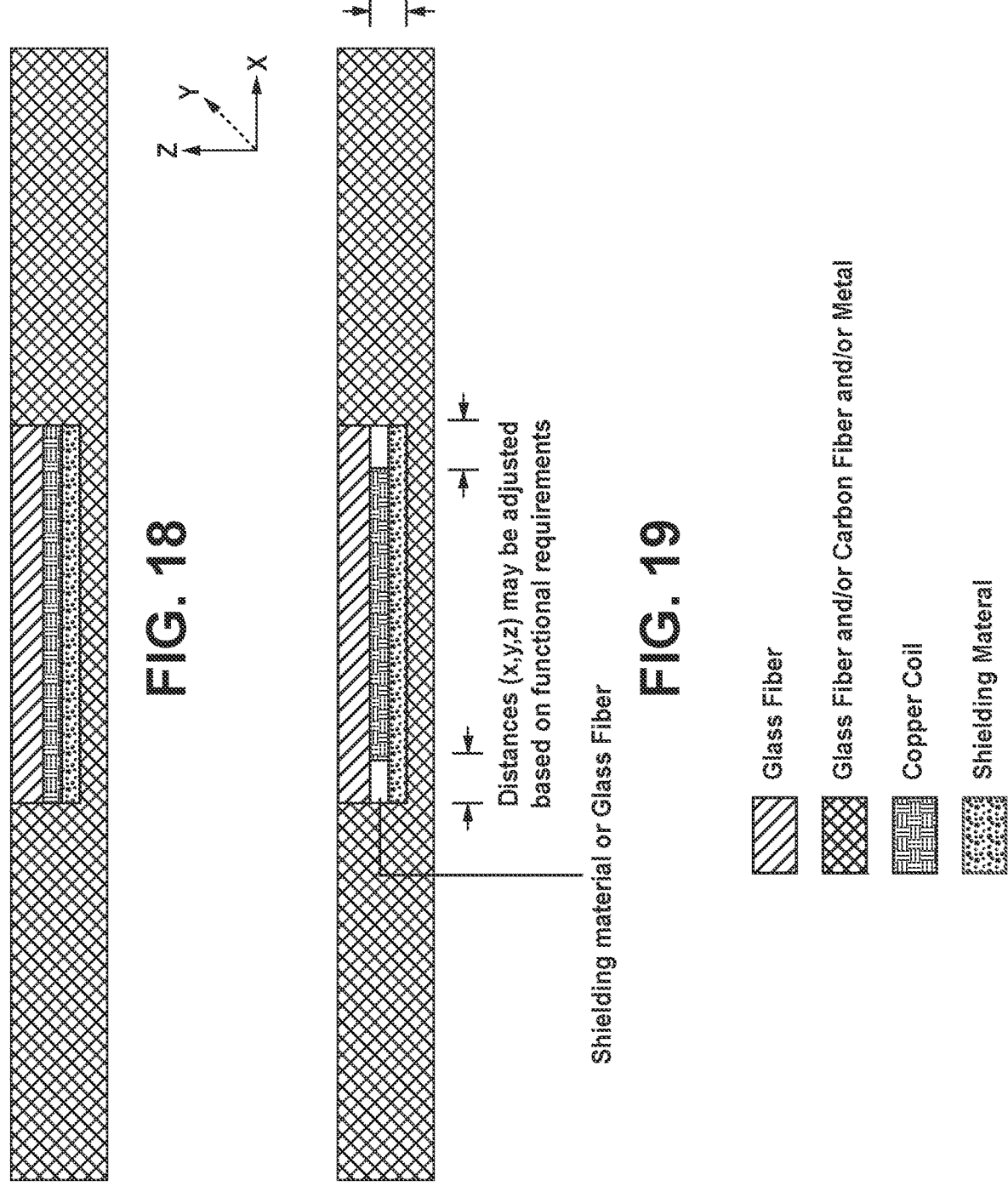

In some examples, the portion of device enclosure 512 further includes at least one shielding element that is configured performing electronic shielding for wireless charging module 512 and reduce effects of electromagnetic interference. In some cases, the at least one shielding element may be part of wireless charging module 519, and may be positioned adjacent to, e.g., one or more coils included with wireless charging module 519. In other cases, the at least one shielding element may include one or more sheet layers (e.g., e.g., injected molded pucks) of a shielding material (e.g., ferrite material) that are positioned adjacent, or otherwise attached, to the wireless charging module, such as illustrated in FIGS. 18-19. In FIGS. 18-19, the wireless charging module may comprise a copper coil, and one or more sheet layers of a shielding material may be positioned adjacent to the copper coil (e.g., beneath the coil within the recessed region). In some cases, such as shown in FIG. 19, a shielding material or glass fiber may be used to separate the coil from the conductive element, such as shown on both the left and right sides of the copper coil in FIG. 19. The distances shown in FIG. 19, which relate to the depth positioning of the wireless charging unit with the recessed region (e.g., distance between the top of the recessed region and the top of the wireless charging unit), and the amount of separation between the conductive element and the left/right sides of the wireless charging unit, may be adjusted on any functional parameters, similar to the adjustment of distances described above in reference to FIG. 5.

Figure 20:
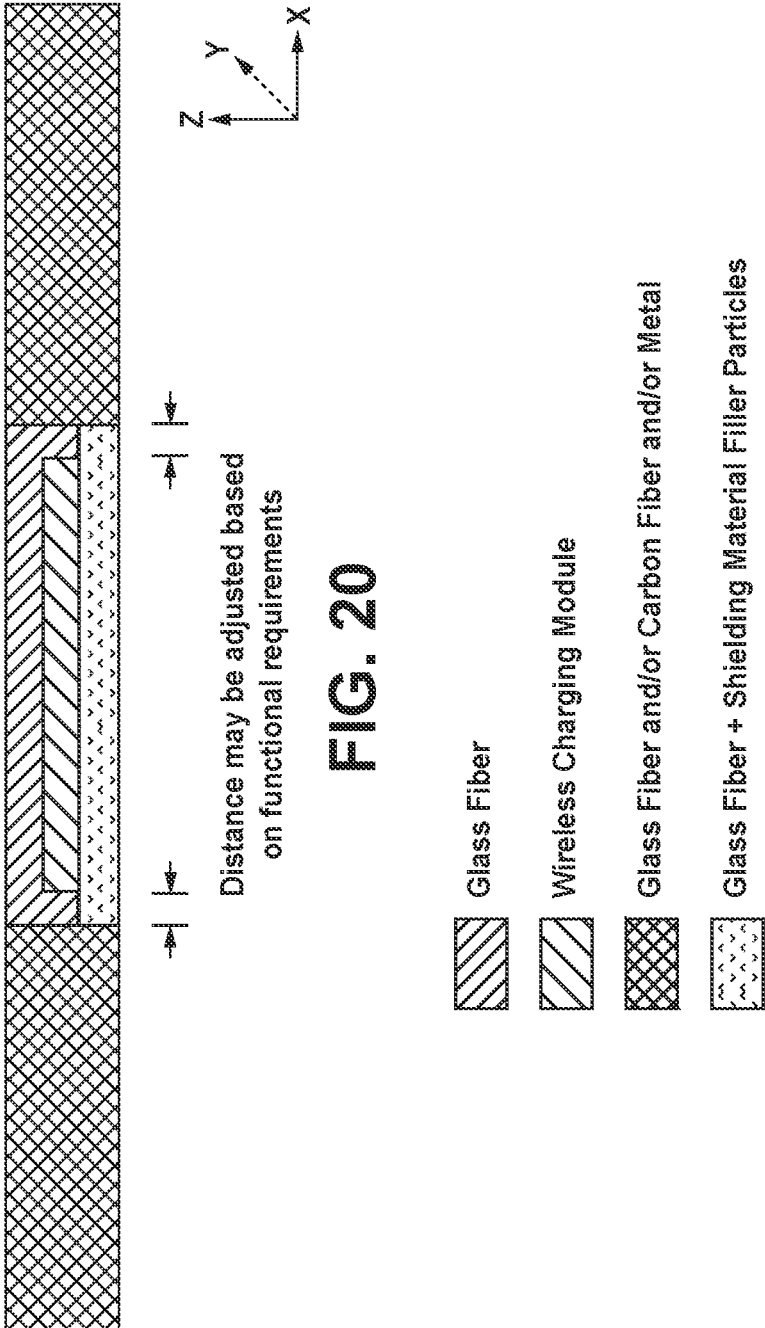

In other cases, the at least one shielding element may include filler particles of a shielding material that are actually dispersed within one or more portions of device enclosure 512. For instance, these filler particles can be embedded into at least a portion of insulative element 517, such as shown in the example of FIG. 20. Controlling the injected locations of these particles into insulative element 517 can provide selective shielding of wireless charging module 519.

In certain examples, the portion of device enclosure 512 shown in FIG. 5 further comprises at least one thermal spreading element that is configured to transfer heat away from wireless charging module 519. By embedding wireless charging module 519 into the device enclosure and providing a thermal spreading element, heat can be transferred away from wireless charging module 519 (e.g., passively), which may provide one or more operating efficiencies of wireless charging module 519 and one or more other components that are located inside the device enclosure (e.g., the one or more processors). In some cases, the at least one thermal spreading element comprises at least a portion of first element 515, such as shown in the examples of FIGS. 6-7 and 12-13, which may in some cases also be combined with a shielding material (e.g., inserted shielding particles or sheets or shielding material, as described above) to draw heat away from wireless charging unit 519. In these cases, the thermal spreading element may be an injected molded heat spreader, and may in some cases be part of first element 515, where wireless charging module 519 is positioned between this portion of first element 515 and a portion of insulative element 517. In some other cases, the at least one thermal spreading element is positioned adjacent to wireless charging module 519, where the at least one thermal spreading element comprises one of copper tape, a vapor chamber, or a heat pipe, such as shown in the examples of FIGS. 8-9 and 16-17.

Figures 12, 13:
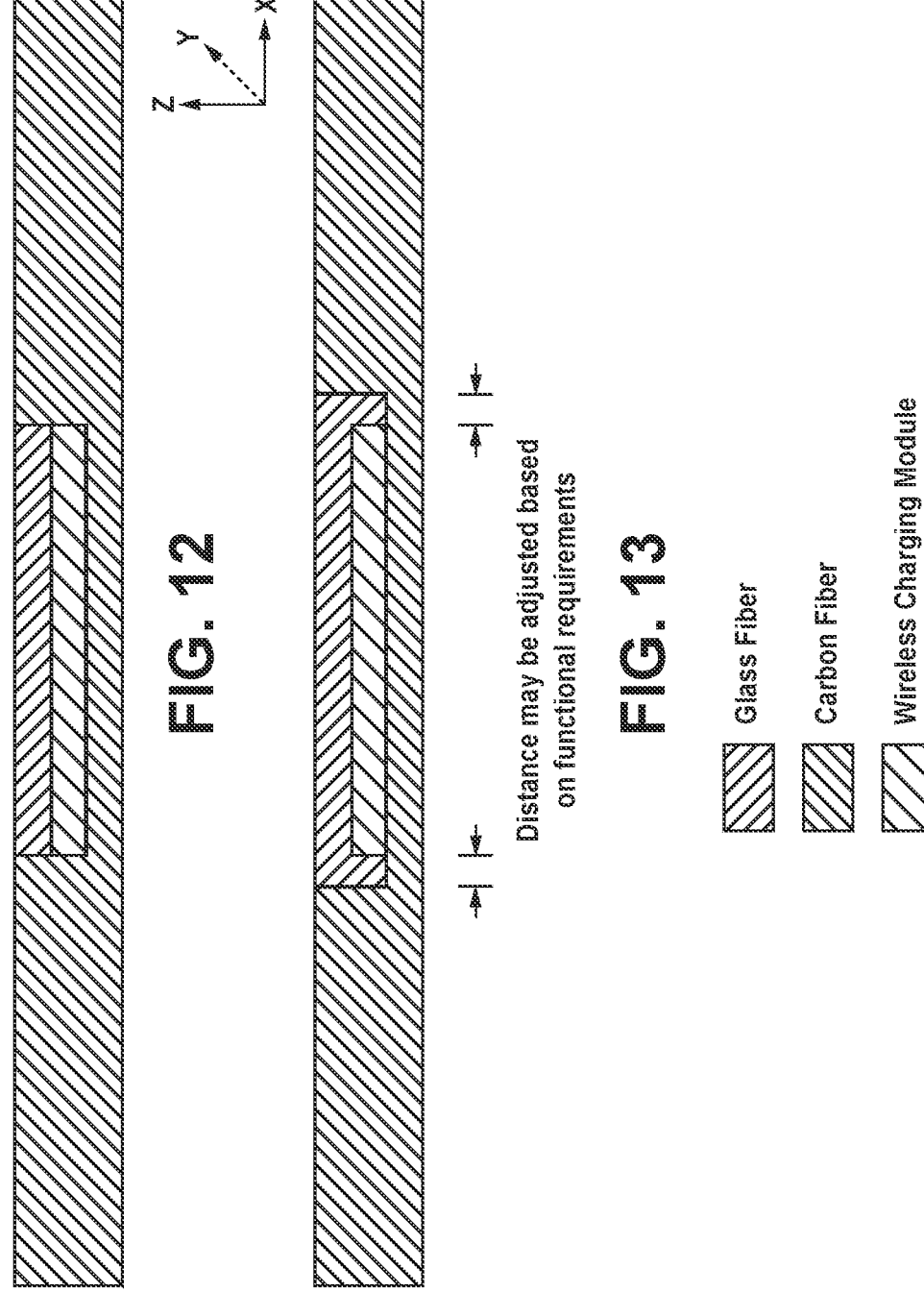

FIG. 6 illustrates an example portion of device enclosure 612, which is one example of device enclosure 312 of FIG. 3. As shown in the cross-sectional view of FIG. 6, the illustrated portion of device enclosure 612 includes at least one first element 615 and region 611. Wireless charging module 619 is formed at the bottom of region 611, beneath at least one insulative element. In certain examples, insulative element 617 may comprise glass fiber, and first element 615 may comprise carbon fiber. In other examples, first element 615 may any combination of one or more of carbon fiber, metal, plastic, and/or glass fiber. In certain cases, one or more portions of first element 615 that are adjacent to wireless charging module 619 (e.g., the portion of first element 615 positioned below wireless charging module 619 in FIG. 6) may serve as a thermal spreading element that is configured to transfer heat away from wireless charging module 619. This portion of first element 615 may, in some cases, also be combined with a shielding material (e.g., inserted shielding particles, as described above) to draw heat away from wireless charging unit 619. FIG. 12 illustrates one example of FIG. 6.

FIG. 7 is a cross-sectional diagram illustrating an alternate example of a portion of device enclosure 712, which also includes at least one first element 715, region 711, at least one insulative element 717, and wireless charging module 719. The example of FIG. 7 is similar to the example of FIG. 6, except that there are defined width distances 725 and 727 between wireless charging module 719 and first element 715 on each side of region 711, as illustrated in FIG. 7. In the view of FIG. 7, distance 725 separates a portion of wireless charging module 719 from a portion of first element 715 on the left side by one portion of insulative element 717, and distance 727 separates another portion of wireless charging module 719 from another portion of first element 715 on the right side by another portion of insulative element 717. During the manufacturing process, distances 725 and 727 may be adjusted based on certain functional parameters, similar to that described above in reference to FIG. 5. FIG. 13 illustrates one example of FIG. 7. In certain cases, at least one boundary between one or more sheet layers of one type of material (e.g., first element 715, such as carbon fiber or metal) may overlap and/or interlock (e.g., similar to knuckle joints) with one or more sheet layers of another type of material (e.g., insulative element 717, such as glass fiber), such as shown in the example of FIG. 21.

Figures 16, 17:
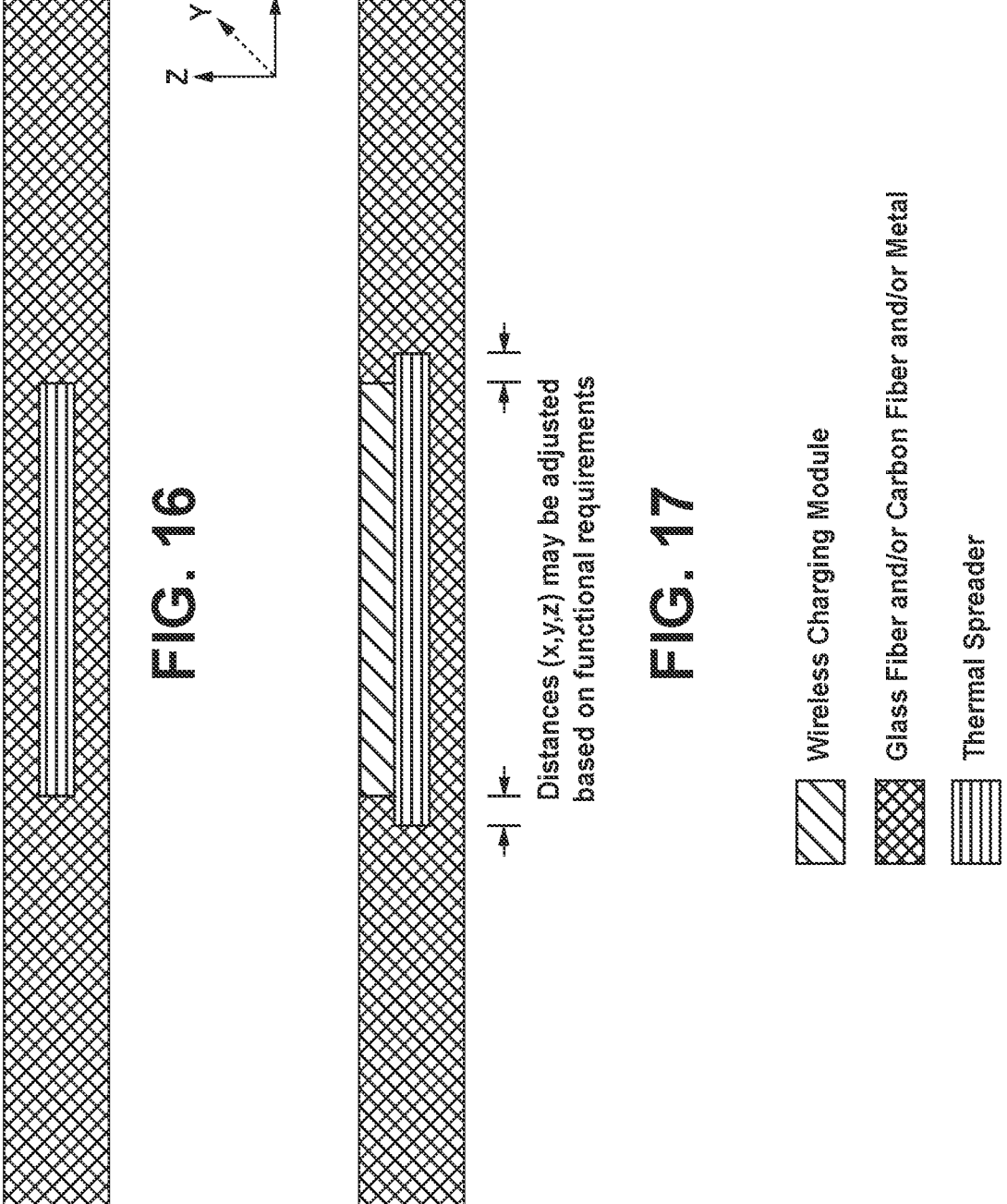

FIG. 8 illustrates an example portion of device enclosure 812, which is one example of device enclosure 312 of FIG. 3. As shown in the cross-sectional view of FIG. 8, the illustrated portion of device enclosure 812 includes at least one first element 815 and region 811. FIG. 16 illustrates one example of the enclosure shown in FIG. 8. At least one thermal spreading unit 833 may be positioned within region 811. In some examples, first element 815 may be formed of any combination of one or more of carbon fiber, metal, plastic, and/or glass fiber. Thermal spreading element 833 is configured to spread or transfer heat away from one or more components, including potentially away from one or more components of the computing device that are located inside device enclosure 812. In some cases, thermal spreading element 833 may comprise a thermal spreading material, which may be one of copper tape, a vapor chamber, or a heat pipe, such as shown in the examples of FIGS. 8-9 and 16-17.

FIG. 9 is a cross-sectional diagram illustrating an alternate example of a portion of device enclosure 912, which also includes at least one first element 915, region 911, wireless charging module 919, and at least one thermal spreading element 933. The example of FIG. 9 is similar to the example of FIG. 8, except that FIG. 9 includes a wireless charging module 919, and there are defined width distances 935 and 937 that extend portions of thermal spreading element underneath wireless charging unit 919 on each side of region 911, as illustrated in FIG. 9. In the view of FIG. 9, a left portion of thermal spreading element 933 extends distance 935 underneath and beyond a left side or edge of wireless charging unit 919 in region 911, and a right portion of thermal spreading element 933 extends distance 937 underneath and beyond a right side or edge of wireless charging unit 919. During the manufacturing process, distances 935 and 937 may be adjusted based on one or more functional parameters, which may be used to optimize thermal spreading for various different operating conditions.

Figure 23:
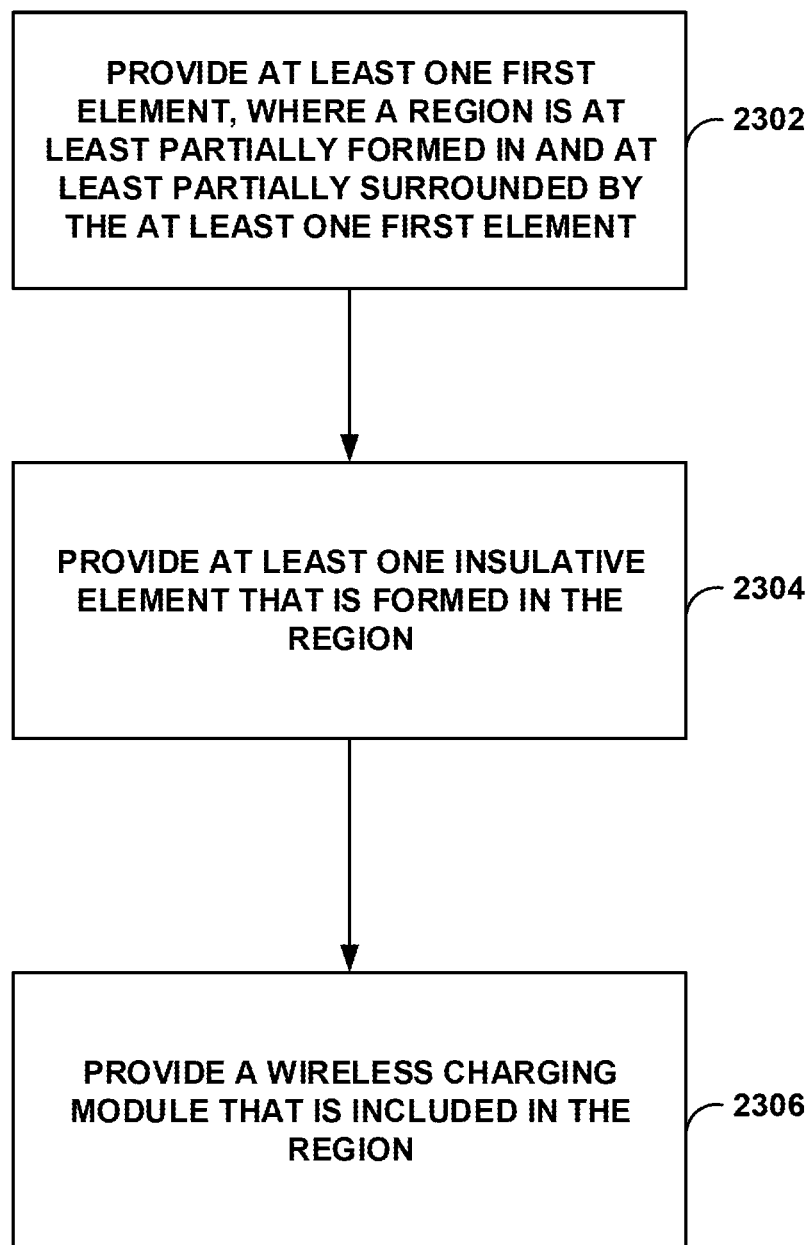
FIG. 23 is a flow diagram illustrating an example process that may be performed to manufacture at least one portion of a device enclosure that at least partially encloses a mobile computing device, in accordance with one or more aspects of the present disclosure.

FIG. 23 is a flow diagram illustrating an example process 2300 that may be performed to manufacture at least one portion of a device enclosure that at least partially encloses a mobile computing device, in accordance with one or more aspects of the present disclosure. One or more techniques of FIG. 23 may be used to form the device enclosure shown and/or described in any of FIGS. 1-22.

Process 2300 includes acts 2302, 2304, and 2306. Act 2302 includes providing at least one first element, where a region is at least partially formed in and at least partially surrounded by the at least one first element. Act 2304 includes providing at least one insulative element that is formed in the region, wherein the at least one insulative element includes at least one electrically insulative material.

Act 2306 includes providing a wireless charging module that is included in the region, wherein the wireless charging module is configured to wirelessly communicate with an external charging device to induce a current in the wireless charging unit, and wherein the current is used to charge a battery of the mobile computing device.

The following clauses are provided for purposes of illustration only.

Clause 1: A mobile computing device, comprising: one or more processors; a battery; and a device enclosure that at least partially encloses the mobile computing device, wherein at least one portion of the device enclosure comprises: at least one first element; a region that is at least partially formed in and at least partially surrounded by the at least one first element; at least one insulative element formed in the region, wherein the at least one insulative element includes at least one electrically insulative material; and a wireless charging module included in the region, wherein the wireless charging module is configured to wirelessly communicate with an external charging device to induce a current in the wireless charging unit, and wherein the current is used to charge the battery of the mobile computing device.

Clause 2: The mobile computing device of clause 1, wherein the at least one portion of the device enclosure is made of a composite resin in which the at least one first element, the region, the at least one insulative element, and the wireless charging module are included.

Clause 3: The mobile computing device of clause 1, wherein the at least one first element includes one or more of at least one conductive element having at least one electrically conductive material, at least one insulative element having at least one electrically insulative material, or any combination thereof.

Clause 4: The mobile computing device of clause 1, wherein the at least one portion of the device enclosure further comprises: at least one shielding element that is configured performing electronic shielding for the wireless charging module.

Clause 5: The mobile computing device of clause 4, wherein the at least one shielding element comprises particles of a shielding material dispersed within the at least one insulative element.

Clause 6: The mobile computing device of clause 4, wherein the at least one shielding element comprises one or more sheet layers of a shielding material that are positioned adjacent to the wireless charging module.

Clause 7: The mobile computing device of clause 1, wherein the at least one portion of the device enclosure further comprises: at least one contact element that is coupled to the wireless charging module, wherein the at least one contact element is configured to electrically couple the wireless charging module to the mobile computing device.

Clause 8: The mobile computing device of clause 7, wherein at least a portion of the at least one contact element is exposed on an inner portion of the device enclosure to one or more components located inside of the device enclosure.

Clause 9: The mobile computing device of clause 8, wherein the region comprises a recessed region, and wherein at least a portion of the wireless charging module is exposed on the inner portion of the device enclosure to the one or more components located inside of the device enclosure.

Clause 10: The mobile computing device of clause 8, wherein at least a portion of the at least one first element or the at least one insulative element separates the wireless charging module from the inner portion of the device enclosure.

Clause 11: The mobile computing device of clause 1, wherein the at least one portion of the device enclosure further comprises: at least one thermal spreading element that is configured to transfer heat away from the wireless charging module.

Clause 12: The mobile computing device of clause 11, wherein the at least one thermal spreading element comprises at least a portion of the at least one first element, and wherein the wireless charging module is positioned between the portion of the at least one first element and a portion of the insulative element.

Clause 13: The mobile computing device of clause 11, wherein the at least one thermal spreading element is positioned adjacent to the wireless charging module, and wherein the at least one thermal spreading element comprises one of copper tape, a vapor chamber, or a heat pipe.

Clause 14: The mobile computing device of clause 1, wherein the at least one insulative element formed in the region comprises one or more sheet layers of glass fiber.

Clause 15: The mobile computing device of clause 14, wherein at least one of the one or more sheet layers of glass fiber is positioned above the wireless charging module within the region.

Clause 16: The mobile computing device of clause 1, wherein a top portion of the wireless charging module is positioned a defined distance beneath a top portion of the region.

Clause 17: The mobile computing device of clause 1, wherein a portion of the at least one insulative element formed in the region separates a portion of the wireless charging module from a portion of the at least one first element by a defined distance.

Clause 18: The mobile computing device of clause 1, wherein the region has a cross-sectional area that is one of a rectangular-shaped area or a circular-shaped area.

Clause 19: The mobile computing device of clause 1, wherein the mobile computing device further includes a display device, and wherein the mobile computing device comprises one of a smartphone or a smartwatch.

Clause 20: The mobile computing device of clause 1, wherein the mobile computing device comprises a wireless headphone unit.

Clause 21: The mobile computing device of any of clauses 1-3, wherein the at least one first element includes at least one sheet layer of one or more of metal, glass fiber, plastic, carbon fiber, or any combination thereof.

Clause 22: The mobile computing device of any of clauses 1-3 or 21, wherein the at least one portion of the device enclosure further comprises: at least one shielding element that is configured performing electronic shielding for the wireless charging module.

Clause 23: The mobile computing device of clause 22, wherein the at least one shielding element comprises particles of a shielding material dispersed within the at least one insulative element.

Clause 24: The mobile computing device of clause 22, wherein the at least one shielding element comprises one or more sheet layers of a shielding material that are positioned adjacent to the wireless charging module.

Clause 25: The mobile computing device of any of clauses 1-3 or 21-24, wherein the at least one portion of the device enclosure further comprises: at least one contact element that is coupled to the wireless charging module, wherein the at least one contact element is configured to electrically couple the wireless charging module to the mobile computing device.

Clause 26: The mobile computing device of clause 25, wherein at least a portion of the at least one contact element is exposed on an inner portion of the device enclosure to one or more components located inside of the device enclosure.

Clause 27: The mobile computing device of clause 26, wherein the region comprises a recessed region, and wherein at least a portion of the wireless charging module is exposed on the inner portion of the device enclosure to the one or more components located inside of the device enclosure.

Clause 28: The mobile computing device of clause 26, wherein at least a portion of the at least one first element or the at least one insulative element separates the wireless charging module from the inner portion of the device enclosure.

Clause 29: The mobile computing device of any of clauses 1-3 or 21-28, wherein the at least one portion of the device enclosure further comprises: at least one thermal spreading element that is configured to transfer heat away from the wireless charging module.

Clause 30: The mobile computing device of clause 29, wherein the at least one thermal spreading element comprises at least a portion of the at least one first element, and wherein the wireless charging module is positioned between the portion of the at least one first element and a portion of the insulative element.

Clause 31: The mobile computing device of clause 29, wherein the at least one thermal spreading element is positioned adjacent to the wireless charging module, and wherein the at least one thermal spreading element comprises one of copper tape, a vapor chamber, or a heat pipe.

Clause 32: The mobile computing device of any of clauses 1-3 or 21-31, wherein the at least one insulative element formed in the region comprises one or more sheet layers of glass fiber.

Clause 33: The mobile computing device of clause 32, wherein at least one of the one or more sheet layers of glass fiber is positioned above the wireless charging module within the region.

Clause 34: The mobile computing device of any of clauses 1-3 or 21-33, wherein a top portion of the wireless charging module is positioned a defined distance beneath a top portion of the region.

Clause 35: The mobile computing device of any of clauses 1-3 or 21-34, wherein a portion of the at least one insulative element formed in the region separates a portion of the wireless charging module from a portion of the at least one first element by a defined distance.

Clause 36: The mobile computing device of any of clauses 1-3 or 21-35, wherein the region has a cross-sectional area that is one of a rectangular-shaped area or a circular-shaped area.

Clause 37: The mobile computing device of any of clauses 1-3 or 21-36, wherein the mobile computing device further includes a display device, and wherein the mobile computing device comprises one of a smartphone or a smartwatch.

Clause 38: The mobile computing device of any of clauses 1-3 or 21-37, wherein the mobile computing device comprises a wireless headphone unit.

Clause 39: A device enclosure, comprising: a plurality of portions that at least partially enclose a mobile computing device, wherein at least one portion of the plurality of portions comprises: at least one first element; a region that is at least partially formed in and at least partially surrounded by the at least one first element; at least one insulative element formed in the region, wherein the at least one insulative element includes at least one electrically insulative material; and a wireless charging module included in the region, wherein the wireless charging module is configured to wirelessly communicate with an external charging device to induce a current in the wireless charging unit, and wherein the current is used to charge a battery of the mobile computing device.

Clause 40: A device enclosure configured to at least partially enclose the mobile computing device of any of clauses 1-38.

Clause 41: A method of manufacturing at least one portion of a device enclosure that at least partially encloses a mobile computing device, the method comprising:

providing at least one first element, wherein a region is at least partially formed in and at least partially surrounded by the at least one first element; providing at least one insulative element that is formed in the region, wherein the at least one insulative element includes at least one electrically insulative material; and providing a wireless charging module that is included in the region, wherein the wireless charging module is configured to wirelessly communicate with an external charging device to induce a current in the wireless charging unit, and wherein the current is used to charge a battery of the mobile computing device.

Clause 42: A method of manufacturing at least one portion of the device enclosure of any of clauses 39-40.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically erasable programmable ROM (EEPROM), compact disk (CD)-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes CD, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other embodiments are within the scope of the following claims.

What is claimed is:

1. A mobile computing device, comprising:
one or more processors;
a battery; and
a device enclosure that at least partially encloses the mobile computing device, wherein at least one portion of the device enclosure defines an enclosure wall having a thickness and comprises:
at least one first element defining an exterior surface of the enclosure wall;
at least one insulative element integrated with the at least one first element to form a composite structure, wherein the at least one insulative element includes at least one electrically insulative material; and
a wireless charging module embedded within the at least one insulative element such that the wireless charging module is positioned within the thickness of the enclosure wall, wherein the wireless charging module is configured to inductively couple with an external charging device to induce a current in the wireless charging module, and wherein the current is used to charge the battery of the mobile computing device.

2. The mobile computing device of claim 1,
wherein the at least one portion of the device enclosure is made of a composite resin in which the at least one first element, the at least one insulative element, and the wireless charging module are included, and
wherein the at least one first element includes one or more of at least one conductive element having at least one electrically conductive material, at least one insulative element having at least one electrically insulative material, or any combination thereof.

3. The mobile computing device of claim 1, wherein the at least one portion of the device enclosure further comprises:

at least one shielding element that performs electronic shielding for the wireless charging module.

4. The mobile computing device of claim 3, wherein the at least one shielding element comprises particles of a shielding material dispersed within the at least one insulative element.

5. The mobile computing device of claim 3, wherein the at least one shielding element comprises one or more sheet layers of a shielding material that are positioned adjacent to the wireless charging module.

6. The mobile computing device of claim 1, wherein the at least one portion of the device enclosure further comprises:

at least one contact element that is coupled to the wireless charging module, wherein the at least one contact element is configured to electrically couple the wireless charging module to the mobile computing device, wherein at least a portion of the at least one contact element is exposed on an inner surface of the enclosure wall opposite the exterior surface to one or more components located inside of the device enclosure.

7. The mobile computing device of claim 6, wherein the composite structure defines a recessed region defined within the thickness of the enclosure wall, and wherein at least a portion of the wireless charging module is exposed on the inner surface of the enclosure wall opposite the exterior surface to the one or more components located inside of the device enclosure.

8. The mobile computing device of claim 6, wherein at least a portion of the at least one first element or the at least one insulative element separates the wireless charging module from the inner surface of the enclosure wall.

9. The mobile computing device of claim 1, wherein the at least one portion of the device enclosure further comprises:

at least one thermal spreading element that is configured to transfer heat away from the wireless charging module.

10. The mobile computing device of claim 9, wherein the at least one thermal spreading element comprises at least a portion of the at least one first element, and wherein the wireless charging module is positioned between the portion of the at least one first element and a portion of the insulative element.

11. The mobile computing device of claim 1, wherein the at least one insulative element comprises one or more sheet layers of glass fiber having one or more boundaries that overlap or interlock with one or more sheet layers of the at least one first element to form the composite structure, and wherein at least one of the one or more sheet layers of glass fiber is positioned above the wireless charging module.

12. The mobile computing device of claim 1, wherein a portion of the at least one insulative element separates a portion of the wireless charging module from a portion of the at least one first element.

13. The mobile computing device of claim 1, wherein the mobile computing device comprises one of a smartphone, a smartwatch, or a wireless headphone unit.

14. A device enclosure, comprising:

an enclosure wall having a thickness; and a plurality of portions that at least partially enclose a mobile computing device, wherein at least one portion of the plurality of portions comprises:

at least one first element defining an exterior surface of the enclosure wall;

at least one insulative element integrated with the at least one first element to form a composite structure, wherein the at least one insulative element includes at least one electrically insulative material; and a wireless charging module embedded within the at least one insulative element such that the wireless charging module is positioned within the thickness of the enclosure wall, wherein the wireless charging module is configured to inductively couple with an external charging device to induce a current in the wireless charging module, and wherein the current is used to charge a battery of the mobile computing device.

15. The device enclosure of claim 14, wherein the at least one portion of the device enclosure is made of a composite resin in which the at least one first element, the at least one insulative element, and the wireless charging module are included, and wherein the at least one first element includes one or more of at least one conductive element having at least one electrically conductive material, at least one insulative element having at least one electrically insulative material, or any combination thereof.

16. The device enclosure of claim 14, wherein the at least one portion of the device enclosure further comprises:

at least one shielding element that performs electronic shielding for the wireless charging module.

17. The device enclosure of claim 16, wherein the at least one shielding element comprises particles of a shielding material dispersed within the at least one insulative element.

18. The device enclosure of claim 16, wherein the at least one shielding element comprises one or more sheet layers of a shielding material that are positioned adjacent to the wireless charging module.

19. The device enclosure of claim 14, wherein the at least one portion of the device enclosure further comprises:

at least one contact element that is coupled to the wireless charging module, wherein the at least one contact element is configured to electrically couple the wireless charging module to the mobile computing device, wherein at least a portion of the at least one contact element is exposed on an inner surface of the enclosure wall opposite the exterior surface to one or more components located inside of the device enclosure.

20. The device enclosure of claim 19, wherein the composite structure defines a recessed region defined within the thickness of the enclosure wall, and wherein at least a portion of the wireless charging module is exposed on the inner surface of the enclosure wall opposite the exterior surface to the one or more components located inside of the device enclosure.

* * * * *